United States Patent [19]

Matthews et al.

[11] Patent Number: 4,831,566
[45] Date of Patent: May 16, 1989

[54] METHOD AND APPARATUS FOR CALIBRATION OF A CHARGE RATIO DIGITIZER

[75] Inventors: Henry G. Matthews, Haddam; Thomas Zalenski, Killingworth; Jamie L. Barbetti, Milford; Al Mletzko, Woodbury, all of Conn.

[73] Assignee: Summagraphics Corporation, Fairfield, Conn.

[21] Appl. No.: 28,499

[22] Filed: Mar. 20, 1987

[51] Int. Cl.$^4$ .......................... G08C 21/00; G01B 7/14
[52] U.S. Cl. ............................... 364/571.05; 340/709; 178/18; 178/19; 178/20
[58] Field of Search .................. 340/709, 710; 178/18, 178/19, 20; 324/208; 33/1 M, 23 J, 571, 167, 170, 571.05; 73/1 R

[56] References Cited

U.S. PATENT DOCUMENTS

| | | | |
|---|---|---|---|
| 4,650,926 | 3/1987 | Nakamura et al. | 340/709 |
| 4,661,656 | 4/1987 | Rodgers et al. | 178/18 |
| 4,678,869 | 7/1987 | Kable | 178/19 |
| 4,705,919 | 11/1987 | Dhawan | 178/19 |
| 4,710,595 | 12/1987 | Kimura | 178/19 |
| 4,733,023 | 3/1988 | Tamaru et al. | 178/20 |
| 4,740,660 | 4/1988 | Kimura | 178/19 |

Primary Examiner—Parshotam S. Lall
Assistant Examiner—Ellis B. Ramirez
Attorney, Agent, or Firm—Rosen, Dainow & Jacobs

[57] ABSTRACT

A conventional three-electrode wedge-and-strip pattern in a digitizer tablet surface is used with a conventional cursor or stylus. A phantom cursor electrode is located at predetermined coordinates of the active area of the digitizer tablet beneath the X, Y and balance (B) electrodes and separated therefrom by a layer of dielectric material, preferably an air gap. Prior to use of the digitizer apparatus, the phantom cursor electrode is electrostatically coupled to the X, Y and B electrodes in order to obtain data signals representing the phantom cursor's measured coordinates without compensation for resolution distortion. A microprocessor produces a correction factor using the data signals and the predefined coordinates of the phantom cursor electrode, which correction factor is applied in normal use to compensate for resolution distortion resulting from the unavoidable gaps between the X, Y and B electrodes. Also raw measured data obtained from the electrostatically coupled electrodes is adjusted to compensate for environmental and inherent noise and an offset corresponding to the difference in the reference potentials of the integrator and comparator.

24 Claims, 10 Drawing Sheets

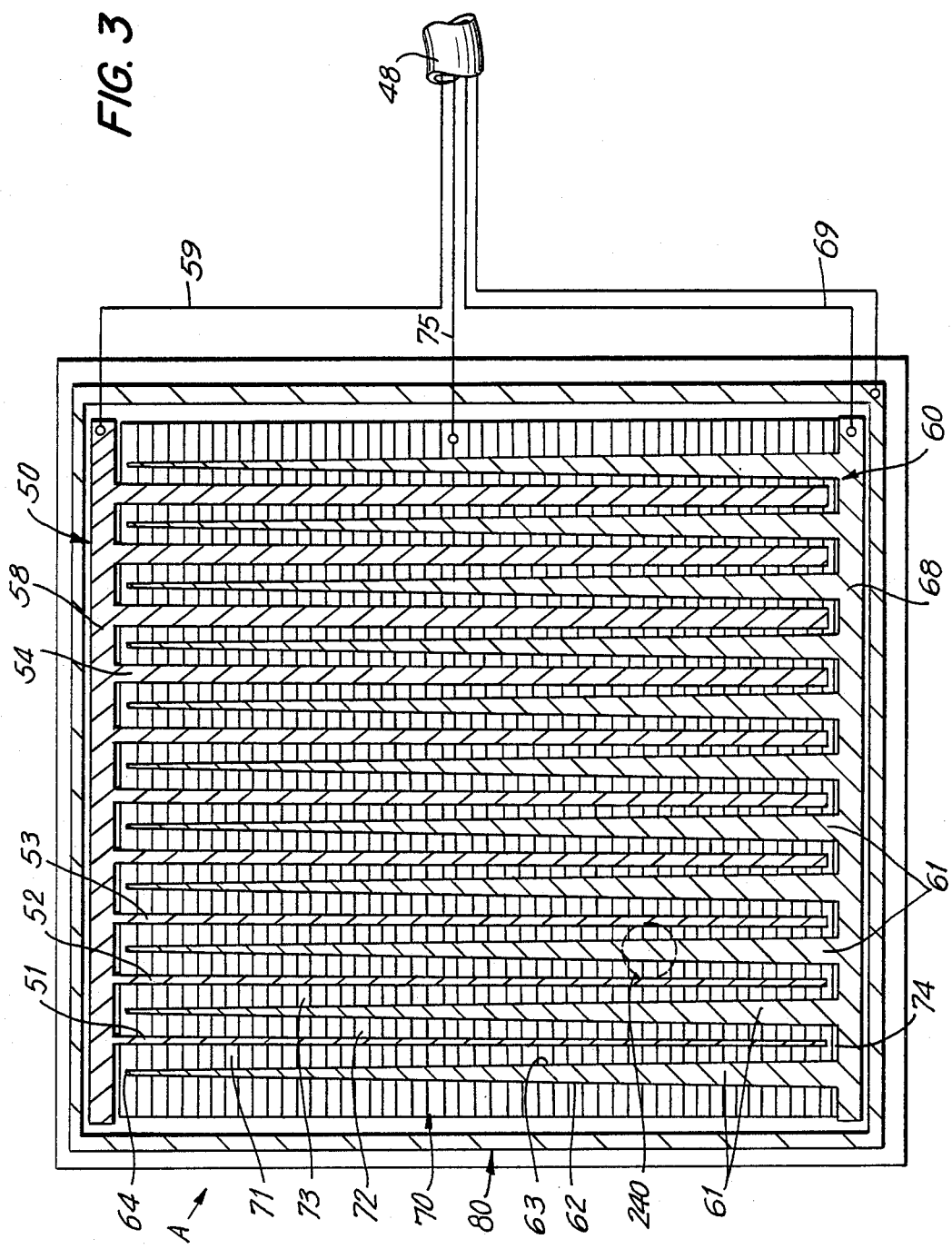

METHOD AND APPARATUS FOR CALIBRATION OF A CHARGE RATIO DIGITIZER

FIELD OF THE INVENTION

This invention relates to a method and apparatus for calibrating a digitizer of a type wherein communication between a patterned electrode layer and a movable cursor is established by electrostatic coupling between the patterned electrodes and the cursor. Position of the cursor on the digitizer surface is determined from signals coupled between the cursor and the patterned electrodes.

BACKGROUND OF THE INVENTION

A charge ratio digitizer of simple construction is one of the wedge and strip type. A digitizer of this type comprises a digitizing tablet and a cursor or stylus movable thereon, wherein an electrical field coupling is utilized to ascertain the position of the cursor or stylus relative to the digitizer tablet. The coordinate system is typically the x-y coordinate system. This type of digitizer is disclosed in U.S. Pat. No. 4,705,919.

The cursor or stylus comprises a housing movable on the surface of the digitizer tablet, the housing containing a coupling electrode. In one embodiment an input signal is applied to the coupling electrode of the cursor or stylus. The coupling electrode field electrically couples to wedge (sawtooth) and strip patterned electrodes embedded in the digitizer tablet. One of the wedge or strip patterned electrodes is used to ascertain the x-axis position of the cursor and the other is used to ascertain the y-axis position of the cursor. The wedge and strip patterned electrodes are conveniently provided in a coplanar arrangement on a printed circuit board and are covered with a layer of dielectric material to provide a smooth tablet surface. In the embodiments where the coupling electrode of the cursor or stylus is driven, the signals induced in the patterned electrodes are processed electronically to ascertain the position of the cursor or stylus relative to the tablet.

In accordance with more specific aspects of the wedge-and-strip type of digitizer, the digitizer tablet has three patterned electrodes which produce an x-axis (X) signal, a y-axis (Y) signal and a balance (B) signal. The X electrode comprises a plurality of conductive rectangular strips disposed vertically and arranged at equal intervals and in order of increasing width from one side to the other side of the tablet, e.g., increasing in width from the left to the right side of the tablet. The Y electrode comprises a plurality of uniform conductive wedges or sawtooths also disposed vertically and arranged at equal intervals with the Y wedges interleaved with the X strips. Movement of the cursor or stylus in the x-axis direction has a negligible effect on the cursor (stylus) coupling with the Y electrode and movement of the cursor (stylus) in the y-axis direction has a negligible effect on the cursor (stylus) coupling with the X electrode. The balance (hereinafter "B") electrode substantially covers the area of the digitizer tablet not covered by the X and Y electrodes, except for interelectrode spacing therebetween.

The coupling electrode located in the cursor (stylus) housing and movable on the surface of the digitizing tablet surface is connected to an oscillator whose frequency typically is in the range of 10 kHz to 1 MHz. The coupling electrode induces electrical signals in the X, Y and B electrodes.

The surface area of the X electrode coupled with the coupling electrode increases as the cursor or stylus is moved or positioned toward the one side of the tablet where the strips are wider, and hence more electrical signal is induced in the X electrode. Similarly, the surface area of the Y electrode coupled with the coupling electrode increases as the cursor or stylus is moved to a region on the tablet where the wedges are wider, and hence more electrical signal is induced in the Y electrode. The X, Y and B electrodes completely cover the area of the tablet except for narrow spacing between the electrodes. It is therefore expected that the sum of the signals on the X, Y and B electrodes will be independent of cursor (stylus) position. This sum signal depends primarily upon the amplitude of the oscillator signal, the proximity of the coupling electrode to the X, Y and B electrodes, and the dielectric constant of the material between the coupling electrode and the X, Y and B electrodes.

Based upon mathematical and electrical concepts, the x coordinate of the cursor or stylus is proportional to the X electrode signal divided by the sum of the X, Y, and B electrode signals. Similarly the y coordinate of the cursor or stylus is expected to be proportional to the Y electrode signal divided by the sum of the X, Y and B electrode signals. In theory, this ratiometric technique should enable accurate measurement of the cursor (stylus) position and be independent of the proximity of the cursor or stylus to the digitizer tablet and the dielectric therebetween.

In the preferred embodiment of wedge-and-strip digitizer, the functions of the coupling electrode and the patterned electrodes are reversed, i.e. input signals are successively applied to the X, Y and B electrodes, and induced signals are output from the coupling electrode in response thereto.

The prior art wedge-and-strip system is disadvantageous in that distortion of the tablet size results from the spacing between the X, Y and B electrodes in the digitizer tablet. This phenomenon will hereinafter be referred to as "resolution distortion". Spacing between the electrodes in the pattern cannot be eliminated because it is necessary to electrically isolate one electrode from the other. Mathematical relationships upon which wedge/strip digitizer design is based require that there be no space between electrodes in order to provide accurate data. However, as indicated, this is a practical manufacturing impossibility. When spacing between electrodes is precisely known and is uniform over the entire pattern, then a mathematical adjustment can be made so that distortions in the output pattern due to electrode spacing can be compensated for.

A further disadvantage of the prior art wedge-and-strip digitizer is that the reading includes a value corresponding to environmental and inherent noise as well as the value produced by electrostatic induction. The environmental noise is attributable to the fact that the tablet acts as an antenna. The inherent noise is caused by undesired internal inductive coupling between components. In addition, the reading includes a value corresponding to an offset representing the difference between the reference potentials of the integrator and comparator.

What is needed is a digitizer construction which reliably and economically provides compensation for the unavoidable spacings between tablet electrodes and for the background effects, i.e. the noise and the offset.

SUMMARY OF THE INVENTION

In accordance with the invention a digitizer of the wedge-and-strip type is provided with a fixed phantom cursor for enabling compensation for resolution distortion, i.e. calibration of the digitizer. The phantom cursor is located in the tablet on the opposite side of the plane of the X, Y and B electrodes from the top surface of the tablet. The phantom cursor is electrostatically (capacitively) coupled to the X, Y and B electrodes.

In the preferred embodiment, a coupling electrode located in a cursor housing and movable over the surface of the digitizer tablet is coupled to one or more of the X, Y and B electrodes, which are driven in accordance with a predetermined pattern. Alternatively, the coupling electrode can be incorporated in a stylus. (Hereinafter the term "cursor" will be generally used with the understanding a stylus can be used in place of a cursor in the invention.) The signals capacitively induced in the coupling electrode are output to the processing circuitry, which determines the coordinate position of a point on the cursor therefrom with compensation for resolution distortion.

The surface area of the X electrode coupled with the cursor increases as the cursor is moved or positioned toward one side of the tablet where the strips are wider and accordingly when the X electrode is driven, the amount of electrical signal coupled to the cursor increases as the cursor moves in the direction of increasing strip width of the X electrode. Similarly, the surface area of the Y electrode coupled with the cursor increases as the cursor is moved to a region of the tablet where the wedges are wider, and accordingly when the Y electrode is driven, the amount of electrical signal coupled to the cursor increases as the cursor moves in the direction of increasing wedge width of the Y electrode.

Three separate driving circuits respectively apply square wave signals to the X, Y and B electrodes and coupling of these signals to the coupling electrode of the cursor is sampled in accordance with a predetermined sampling cycle. Each output signal is amplified, rectified, integrated and digitized to produce a digital signal representing the amount of capacitive coupling induced in the cursor by the one or more driven electrodes. A microprocessor performs mathematical operations on the digital signals in accordance with mathematical relationships for wedge and strip configurations to produce data $X_{in}$ and $Y_{in}$ representative of the x and y coordinates of the cursor position on the digitizer surface. In particular, $$X_{in} = 2C_X/(C_X + C_Y + C_B) \quad (1)$$

$$Y_{in} = 2C_Y/(C_X + C_Y + C_B) \quad (2)$$

where $C_X$ is the digital value corresponding to the signal induced by the driven X electrode, $C_Y$ is the digital value corresponding to the signal induced by the driven Y electrode and $C_B$ is the digital value corresponding to the signal induced by the driven balance electrode. The geometry of the patterned electrodes is such that $0 < X_{in} < 1$ and $0 < Y_{in} < 1$. The digital value representing signal output from the cursor or stylus when the X, Y and B electrodes are driven simultaneously, i.e. $C_X + C_Y + C_B$, will hereinafter be referred to as $C_{sum}$.

The $C_X$, $C_Y$ and $C_{sum}$ values are obtained by adjusting the raw readings to compensate for the noise and the offset in accordance with the following equations:

$$C_X = A_X - B_X \quad (3)$$

$$C_Y = A_Y - B_Y \quad (4)$$

$$C_{sum} = A_{sum} - B_{sum} \quad (5)$$

where $A_X$, $A_Y$ and $A_{sum}$ are respectively the digital values (i.e. raw readings) obtained in response to driving of the X electrode alone, the Y electrode alone and the X, Y and B electrodes together when the stylus or cursor is enabled, and $B_X$, $B_Y$ and $B_{sum}$ are respectively the digital values (i.e. background readings) obtained in response to driving of the X electrode alone, the Y electrode alone and the X, Y and B electrodes together when the stylus or cursor is disabled.

To compensate for the noise and the offset, a digitizer construction is provided wherein readings $B_X$, $B_Y$ and $B_{sum}$ are taken when the stylus or cursor is disabled. Each background reading is the sum of the digital value corresponding to the environmental and inherent noise and the digital value corresponding to the offset. This summed background digital value is stored in memory and subsequently subtracted from the readings acquired during digitization, i.e. when the stylus or cursor is enabled.

The microprocessor also operates upon the acquired data using correction factors to compensate for resolution distortion. Because of the inherent distortions discussed above, the x and y coordinates cannot be determined simply from the values $2C_X/C_{sum}$ and $2C_Y/C_{sum}$. The x and y coordinates can be determined only after a calibration has been performed to compensate for resolution distortion. This calibration is performed by processing the signal output from a small conductive plate built into the digitizer tablet. This plate will hereinafter be referred to as the "phantom cursor".

The phantom cursor is located at a defined position near an edge or corner of the active coordinate determination area, with the center point of the phantom cursor having predetermined x and y coordinates. The phantom cursor is switchably connected to the same circuitry which processes the movable cursor output signals. Data signals induced in the phantom cursor are digitized by the processing circuitry and then the microprocessor calculates correction factors $f_x$ and $f_y$ from the processed data using the defined position of the phantom cursor electrode and the stored data corresponding to the defined position of the center point of the tablet. The correction factors $f_x$ and $f_y$ are applied to the acquired data $C_X$, $C_Y$ and $C_{sum}$ to provide compensation for pattern distortion resulting from the spacing between the X, Y and B electrodes in the tablet.

In a second preferred embodiment, the coupling electrode in the movable cursor and the phantom cursor electrode are selectively driven instead of the X, Y and B electrodes. The data signals induced in the X, Y and B electrodes in response to driving of the coupling electrode or the phantom cursor electrode are output to the processing circuitry. These data signals are then processed to determine the x and y coordinates of a point on the movable cursor with compensation for resolution distortion.

Accordingly, it is the object of this invention to provide an improved digitizer which eliminates data distortions resulting from spacing between electrodes in the tablet surface of wedge-and-strip type charge ratio digitizers.

It is also an object of the invention to provide an improved digitizer which takes background readings, stores the acquired background values, and then adjusts the raw digitization readings by subtracting the background values to compensate for environmental and inherent noise and the offset corresponding to the difference between the reference potentials of the integrator and comparator.

A further object of this invention is to provide an improved digitizer which is economical to produce, not requiring precision in determining the spacing between tablet surface electrodes.

Yet another object of the invention is to provide an improved method for calibrating a wedge-and-strip type charge ratio digitizer.

Still other objects and advantages of the invention will in part be obvious and will in part be apparent from the specification.

BRIEF DESCRIPTION OF THE DRAWINGS

The preferred embodiment of the invention will be described in detail with reference to the accompanying drawings, in which:

FIG. 3 is a schematized top view of a prior art wedge-and-strip digitizer tablet electrode pattern in accordance with the invention;

DETAILED DESCRIPTION OF THE PREFERRED EMBODIMENTS

Figure 1:
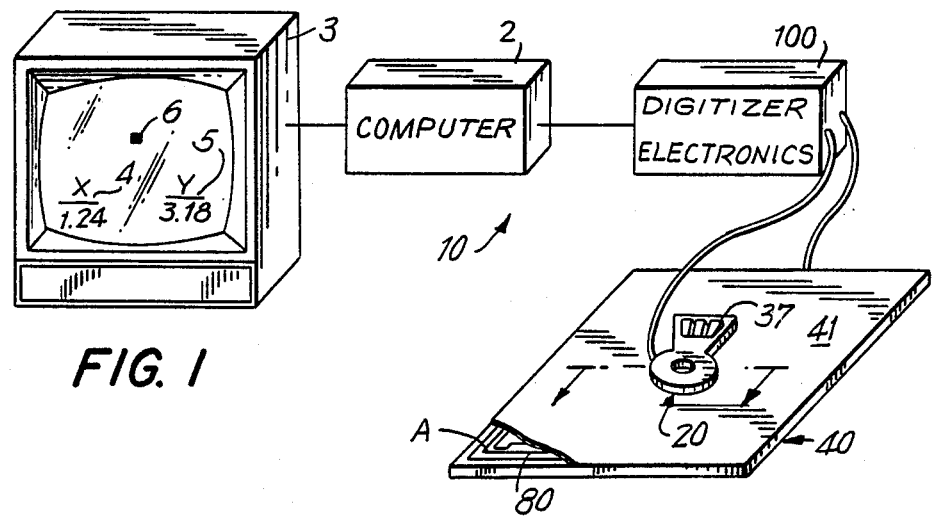
FIG. 1 is a perspective, partially schematic view of a digitizer being used in conjunction with a computer system.
Figure 6A:
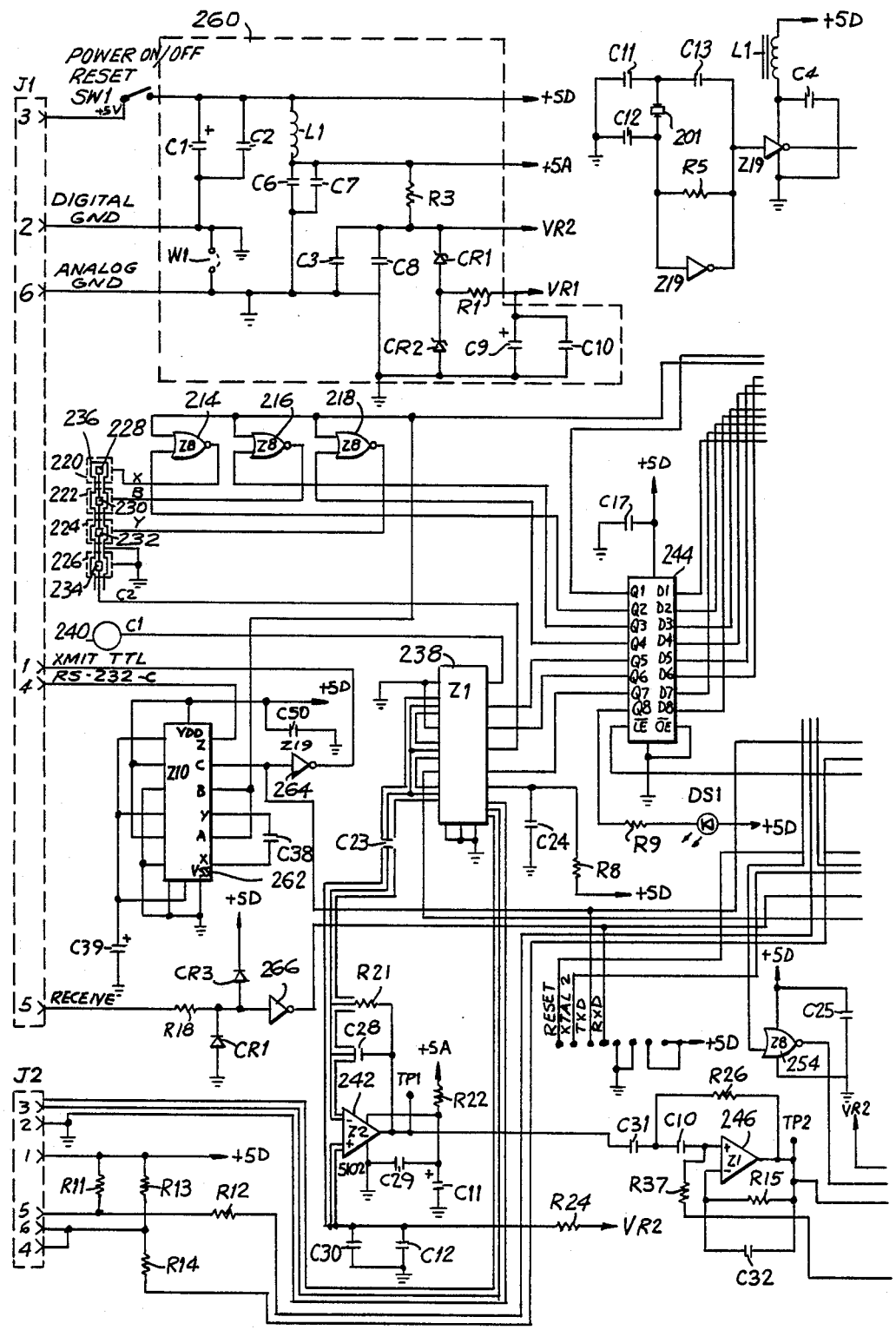
FIGS. 6A and 6B are two parts of the detailed circuit diagram of the printed circuit board incorporated in the tablet in accordance with the invention wherein the X, Y and B electrodes are driven.
Figure 6B:
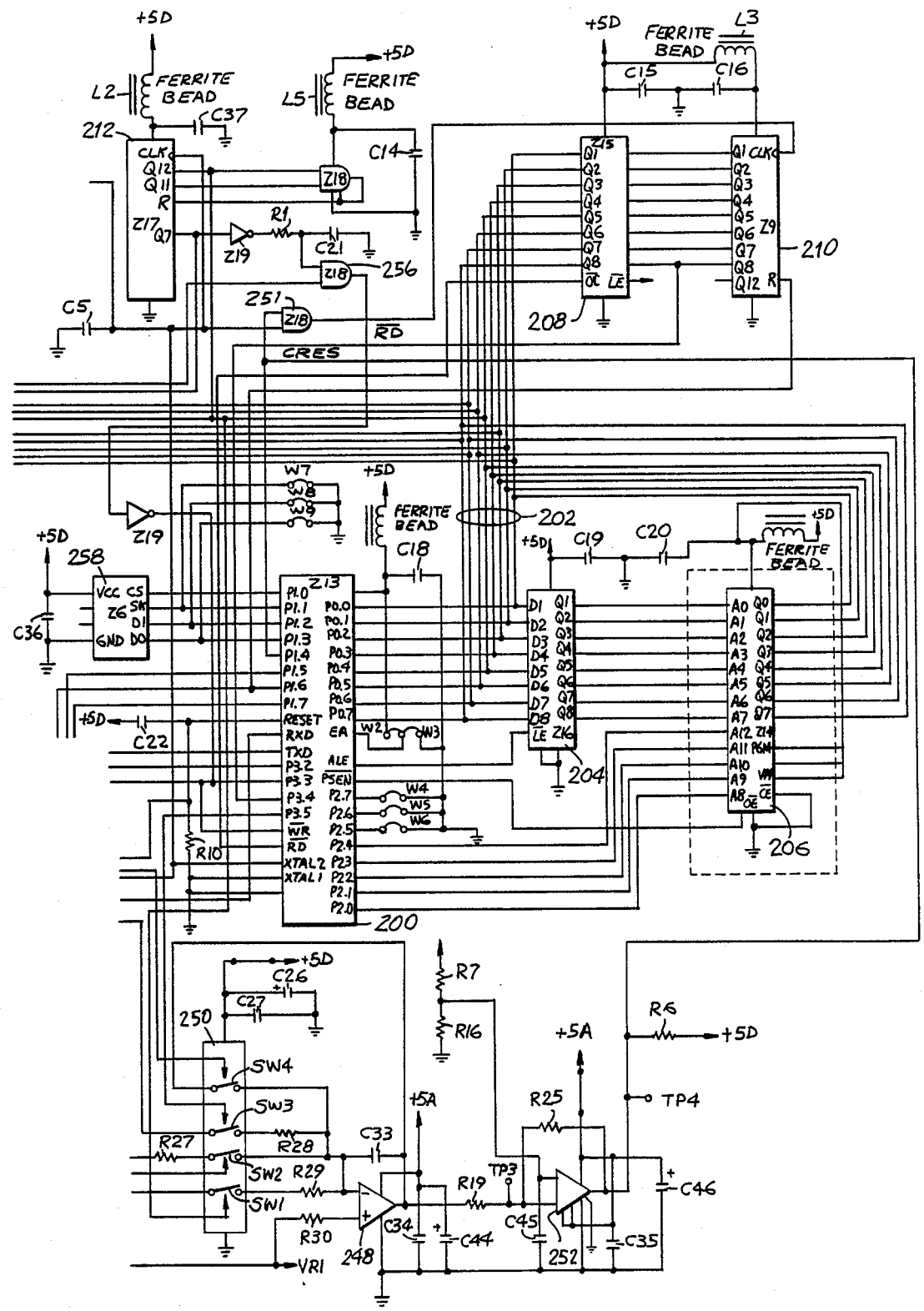

With reference to FIG. 1, a strip and wedge digitizer 10 generally comprises a cursor 20 or stylus (not shown in FIG. 1), a tablet 40 and electronics 100 for providing an input signal to the cursor and processing output signals from the tablet or alternatively, for providing an input signal to the tablet and processing output signals from the cursor. In the preferred embodiment of the invention, the digitizer electronics 100 are incorporated in the tablet 40, beneath the layers shown in FIG. 2 and inside a casing. The circuit diagram for printed circuit board of this preferred embodiment is shown in FIGS. 6A and 6B.

As illustrated in FIG. 1, the digitizer 10 is used as an input device to a computer 2 which generally has a display monitor 3 associated therewith. The monitor 3 may display numeric values of the coordinates representing the position of the cursor 20 relative to the tablet 40, as indicated at 4 and 5 on the monitor display screen. The monitor may also be used to display a cursor dot 6, the position of which on the screen is controlled by the position of the cursor 20 on the tablet 40.

Figure 2:
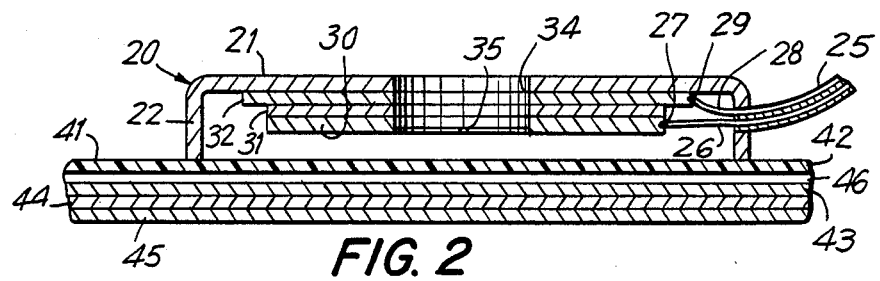
FIG. 2 is an enlarged cross-sectional view of a portion of the active area of a digitizer tablet and a cursor positioned thereon in accordance with the invention.

A cross-sectional view of the cursor 20 and a fragmentary portion of the tablet 40 is shown in FIG. 2. However, although a cursor is described, it is obvious that the tablet can be used in conjunction with a stylus instead of a cursor. The cursor 20 includes a housing 21 having a depending peripheral side wall 22, which slides on the surface of the digitizer tablet 40. Mounted on the underside of the housing 21 (by means not shown) is an annular ground or shield electrode 32. An annular dielectric spacer 31 is fixedly arranged beneath the ground shield electrode 32 in abutment therewith. An annular coupling electrode 30 is fixedly arranged beneath the dielectric spacer 31 in abutment therewith such that the coupling electrode 30 will lie substantially parallel to the tablet surface when the rim of side wall 22 is seated on the tablet surface. The shield electrode 32 is somewhat larger in diameter than the coupling electrode 30 and overhangs the coupling electrode 30 about its peripheral edge.

The coupling electrode 30, dielectric spacer 31 and ground electrode 32, together with the cover 21, define a central circular opening 34 in which cross-hairs 35 are positioned. The cross-hairs 35 are centered with respect to the coupling electrode 30. The inner and outer peripheries of the coupling electrode are preferably circular, although other shapes would be suitable provided that the orientation of the cursor does not affect its electrical coupling with the tablet electrodes. An electrical cord 25 connects the cursor 20 to the digitizer electronics 100, the cord 25 including a signal conducting wire 26 which is connected to the coupling electrode 30 at a terminal 27. A coaxial surrounding conductor 28, that is, a coaxial shield, is connected to the ground or shield electrode 32 within the cursor 20 at a terminal 29. In an embodiment where the cursor is driven, a driving signal is provided to the coupling electrode 30 by way of the signal wire 26 as explained hereinafter. In an embodiment wherein the tablet electrodes are driven, induced signals will be output via wire 26.

The cursor housing 21 has a shape which can comfortably fit in the hand of a user and may be provided with a series of pushbutton switches 37 (see FIG. 1) for communicating with the computer 2.

Alternatively and preferably, the cursor can be replaced by a pressure-sensitive stylus similar to that disclosed in U.S. patent application Ser. No. 028,494 filed Mar. 20, 1987, now U.S. Pat. No. 4,786,764 assigned to the assignee of the present invention and entitled DIGITIZER STYLUS WITH PRESSURE TRANSDUCER, the disclosure of which is incorporated herein by reference.

Figure 8:
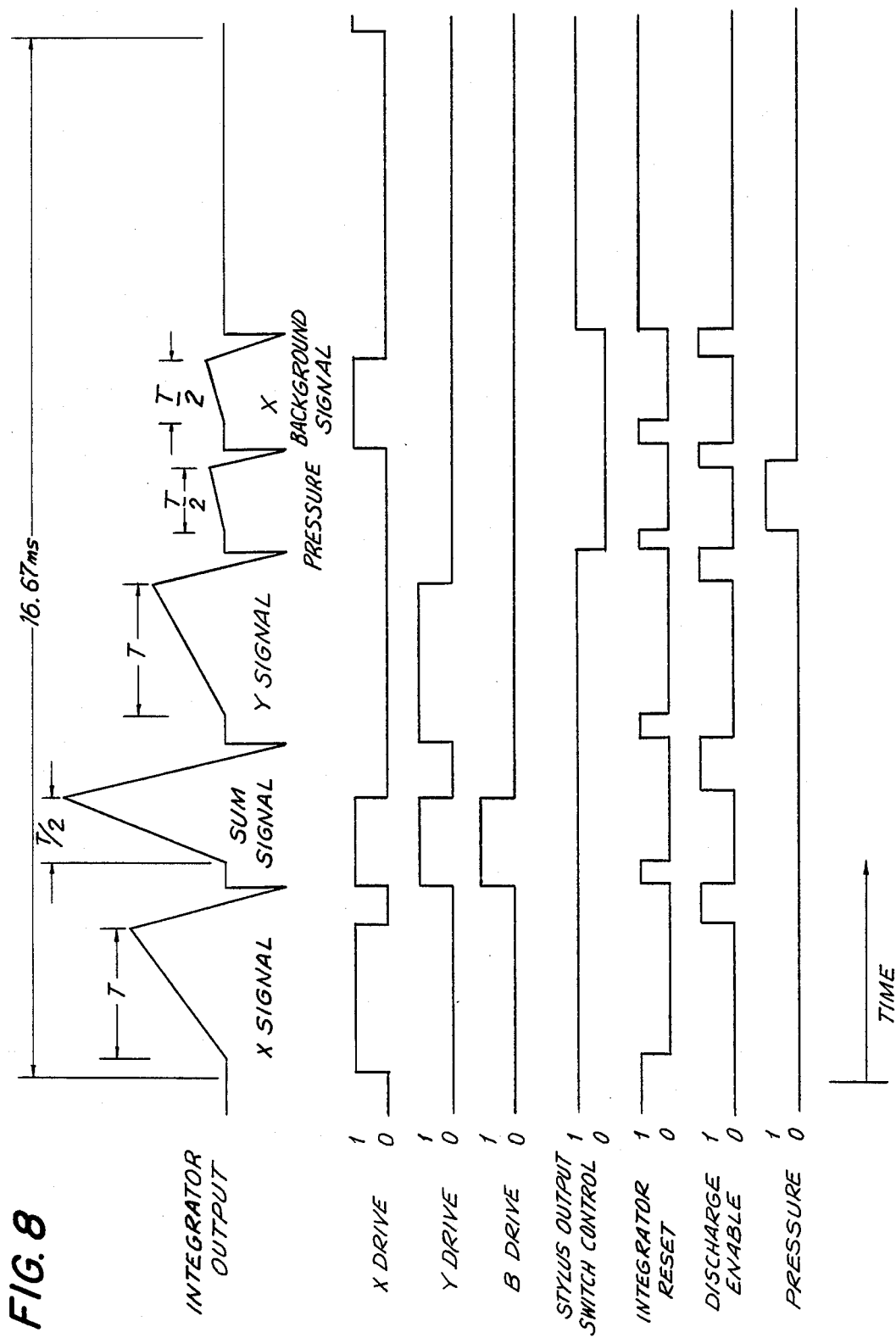
FIG. 8 is a timing diagram for the digitizer in accordance with the invention.

The stylus output signal can be sampled during a separate sampling cycle to determine the amplitude of a signal which is a function of the pressure being exerted on the stylus tip (see pressure cycle in FIG. 8). In this sampling cycle the stylus is disabled in the sense that no current is capacitively induced in the anode of the stylus. Instead a voltage is applied across the terminals of the stylus which produces a current in a circuit including a force-sensing resistant transducer which acts as a variable resistor. The transducer is made of a force-sensing resistant (FSR) material, the resistance of which varies in dependence on the amount of compressive force being exerted in a direction substantially perpendicular to the plane of the transducer layer. The resistance of the FSR transducer decreases as the magnitude of the compressive force increases. This variation in resistance of the FSR material produces a corresponding change in the dc level of the analog signal output during the pressure sampling cycle.

The dc level of the analog signal output from the pressure-sensitive stylus can be detected using a comparator incorporated in the digitizer electronics. The dc level of the analog signal is compared with a reference voltage supplied to the comparator. As the pressure on the stylus tip is increased, the resistance of the FSR transducer decreases, whereby the dc level of the analog signal increases. When the dc level of the analog signal exceeds the reference voltage, the comparator output goes high. In response to the comparator output going high, a switch is closed which enables the flow of digitizing data from the stylus to the processing circuitry of the digitizer electronics during the X, Y and SUM driving cycles. The digitizing data, corresponding to the signals induced in the anode by the driven patterned electrode or electrodes of the charge ratio tablet during the driving cycles, are also output via the stylus terminal, but at different times in the sampling cycle.

Thus, the FSR transducer of the pressure-sensitive stylus functions as a variable resistor, a switch in the digitizer electronics being closed in response to the variable resistance attaining a predetermined value. This predetermined resistance value should be attained at a pressure slightly less than the amount of pressure generally exerted on the tip of the pen refill when the stylus is used to write by a user. The position of the stylus tip relative to the digitizer tablet is determined only for those positions of the stylus tip at which the pressure of the tip against the tablet exceeds a predetermined pressure value, i.e. for those positions when the stylus is being used to write. This predetermined pressure value is the pressure at which the analog signal output from the stylus exceeds a stored predetermined analog value. In response to the stylus output signal surpassing the predetermined stored value, determination of the position of the stylus tip will begin. Likewise when the pressure exerted by the stylus tip falls below the predetermined stored value, position determination is halted.

The digitizer tablet 40 is generally rectangular and has a planar top surface 41 on which the cursor 20 moves (see FIG. 1). The top surface 41 includes a first area overlying the X, Y and B electrodes and a second area overlying a plurality of menu electrodes, the second area lying outside the first area, as disclosed in U.S. patent application Ser. No. 028,495 filed Mar. 20, 1987, now U.S. Pat. No. 4,788,386, assigned to the assignee of the present application and entitled MENU FOR A CHARGE RATIO DIGITIZER, the disclosure of which is incorporated herein by reference.

Predetermined cursor positions in the first area of the top surface 41 can be expressed as values in a finite two-dimensional coordinate system. However, it should be noted that only a rectangular portion of the first area constitutes the active coordinate determination area coextensive with the finite two-dimensional coordinates. Thus, although the X, Y and B electrodes extend beyond the active coordinate determination area and underlie portions of the peripheral margins of the tablet, these margins are inactive in the sense that the coordinates of the cursor are not determinable when the cursor overlies a margin. In the preferred embodiment, this is effected by providing a border of copper shielding 46 between the top layer 42 and the electrode layer 44 (see FIG. 2). (Of course, shielding would not be provided over the menu electrodes, as will be discussed in detail hereinafter.) Alternatively, the same result can be achieved by programming the microprocessor to not process $X_{in}$ and $Y_{in}$ values greater or less than predetermined limits corresponding to the edges of the active coordinate determination area. Therefore, cursor positions overlying the inactive margins will not have corresponding x, y coordinates. The coordinate system used in a preferred embodiment is the orthogonal x-y coordinate system.

The digitizer tablet 40 includes a plastic cover 42. As indicated, the cover 42 provides the smooth upper surface 41 of the digitizer tablet 40. Beneath the cover 42 and outside the active areas of the tablet is a copper shield border 46. Beneath the copper shield border 46 is a layer 43 of dielectric material. The electrode layer 44, comprising the X, Y and B electrodes, menu electrodes, junction electrodes, and connecting conductors (as shown in FIGS. 7A-7C of U.S. patent application Ser. No. 28,495), is applied directly on the dielectric layer. An insulating layer 45 lies beneath the electrode layer 44.

Figure 4:
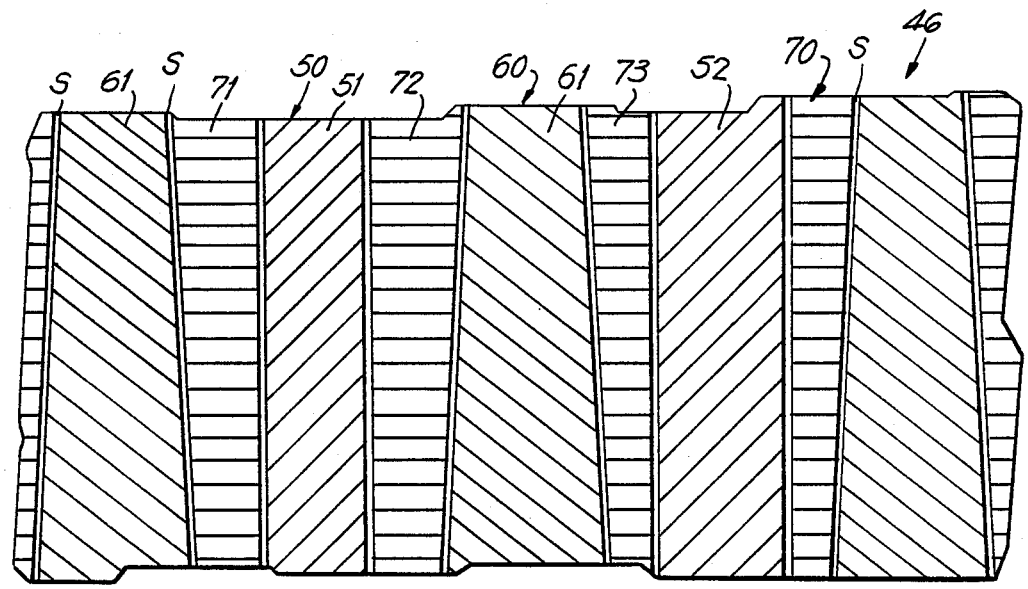
FIG. 4 is a greatly enlarged fragmentary view of a portion of the surface of FIG. 6.

In one embodiment of the digitizer, the digitizer tablet is connected to the electronic circuitry by a multi-conductor cable 48, a shown in FIG. 3. FIGS. 3 and 4 depict the basic structure of the X, Y and B electrodes. The electrode layer 46 of the digitizer tablet 40 includes a patterned electrode 50 which varies in the X direction, a patterned electrode 60 which varies in the Y direction, and a patterned electrode 70 arranged between the X and Y electrodes for providing a balance (B) signal. The electrodes 50, 60, 70 are laid out in a substantially coplanar and rectangular overall configuration and may be surrounded in the same plane by a shield electrode 80. FIG. 3 does not show the menu electrodes incorporated in the tablet in accordance with the invention of U.S. patent application Ser. No. 28,495.

The X electrode 50 includes a plurality of strips, e.g. strips 51, 52, 53, 54, which are connected together along one edge of the electrode layer 46 by an x-axis bus 58. The strips extend in the y direction from one side of the bus 58. The strips are substantially parallel to each other and have center lines spaced apart at substantially equal intervals. However, the individual strips increase progressively in width in the x direction from one side of the tablet 40 to the other side. Thus, the strip 52 is wider than the next strip 51, and strip 53 is wider than strip 52, and so forth across the surface. Electrical signals which are accumulated on any of the strips are conducted by way of the bus 58 to an x-axis signal lead 59, which becomes part of the multi-conductor digitizer tablet cable 48.

The y electrode 60 has a sawtooth or wedge pattern with similar individual wedges interleaved with the strip pattern of the X electrode 50. The Y electrode 60 includes plurality of wedges 61 extending in the Y direction, the wedges 61 being connected together by a y-axis bus 68. Each individual wedge 61 comprises an elongated substantially triangular area having edges 62 and 63, which converge as the wedge extends from the bus 68 to a narrow terminal end 64 adjacent to the x-axis bus 58. The wedges 61 are evenly spaced intermediate to adjacent strips such that the wedges and strips are interleaved. The Y electrode 60 has its bus 68 connected to the digitizer electronics 100 by way of a signal lead 69 which becomes part of the multi-conductor cable 48.

The electrode layer 46 of the digitizer tablet 40 also incorporates a balance (B) electrode 70, which substantially covers the area of the electrode layer 46 between the areas covered by the X and Y electrodes 50, 60, except for the gap which remains between adjacent electrodes. The B electrode 70 takes the form of elongate legs, e.g. 71, 72, 73, which are arranged in a serpentine manner between the interleaved wedges and strips and between the tips of the wedges and strips and the opposing respective bus. For example, legs 71 and 72 flank strip 51, and legs 72 and 73 flank wedge 61. The legs of the B electrode are connected together by connecting sections adjacent to the x-axis bus 58 and y-axis bus 68, e.g. legs 71 and 72 are connected by section 74 between the end of strip 51 and the y-axis bus 68. The B electrode 70 is connected to the digitizer electronics 100 of the digitizer by means of a signal lead 75 which becomes part of the multi-conductor cable 48.

The electrode layer 46 further comprises a shield electrode 80, which is deployed about the perimeter of the X, Y and B electrodes. The shield electrode 80 may be connected to the shield of the cable 48, as indicated in FIG. 3.

The electrodes 50, 60 and 70 are electrically isolated from each other as the result of the gap separating the electrodes. The gap between electrodes is more clearly illustrated in FIG. 4, which is an enlarged fragmentary view of the electrode layer 46 illustrated in FIG. 3. The small spacing or gap provided between all of the adjacent electrode edges is indicated by the letter S. The spacing is generally constant for a given electrode layer 46 but will vary between production sources and production runs.

It should be understood that FIG. 4 is illustrated in enlarged scale and schematically for purposes of illustration. Actual strips, wedges and spacing S are much finer than are illustrated in this drawing. In an embodiment which performed satisfactorily, there were five x-axis pattern strips and five y-axis pattern wedges per inch. The increase in width from one x-axis strip to the adjacent x-axis strip, for example, between strips 52 and 53 of FIG. 3, was approximately 0.001 inch.

The digitizer tablet 40 has a useful coordinate determination surface confined to the area of the wedges and strips, respectively, of the X and Y electrodes 50, 60, and the useful digitizing surface generally does not include the x-axis bus 58 and y-axis bus 68.

The coupling electrode 30 of the cursor 20 (see FIG. 2) and the coupling electrode (anode) of the pressure-sensitive stylus (not shown) are sized and spaced from the tablet 40 such that the coupling electrode is capacitively coupled to a plurality of strips and wedges, preferably at least five, during driving of the X and Y electrodes. Thus, at any given time, several elements of each of the X, Y and B electrodes are coupled to the coupling electrode.

The X electrode 50, Y electrode 60, and B electrode 70 may be formed of copper, silver, conductive ink or any other conductive material deposited on a printed circuit board material, wherein the printed circuit board forms the dielectric layer 43 of the digitizer tablet 40. Other fabrication techniques include printing the electrodes in conductive ink on a thin film of Mylar or similar material, and affixing the film with the electrodes printed thereon to either the top surface of dielectric layer 43 or the bottom surface of plastic cover 42 of the digitizer tablet 40.

The wedge-and-strip digitizer operates by capacitive coupling between the coupling electrode 30 of the cursor 20 and the patterned X, Y and B electrodes of the digitizer tablet 40. In one embodiment, a driving signal input to the cursor 20 is coupled to the electrodes 50, 60, 70 of the tablet 40, and the resultant signals output from the tablet electrodes are processed to determine the x and y coordinates of the cursor position on the tablet surface 41.

Figure 5:
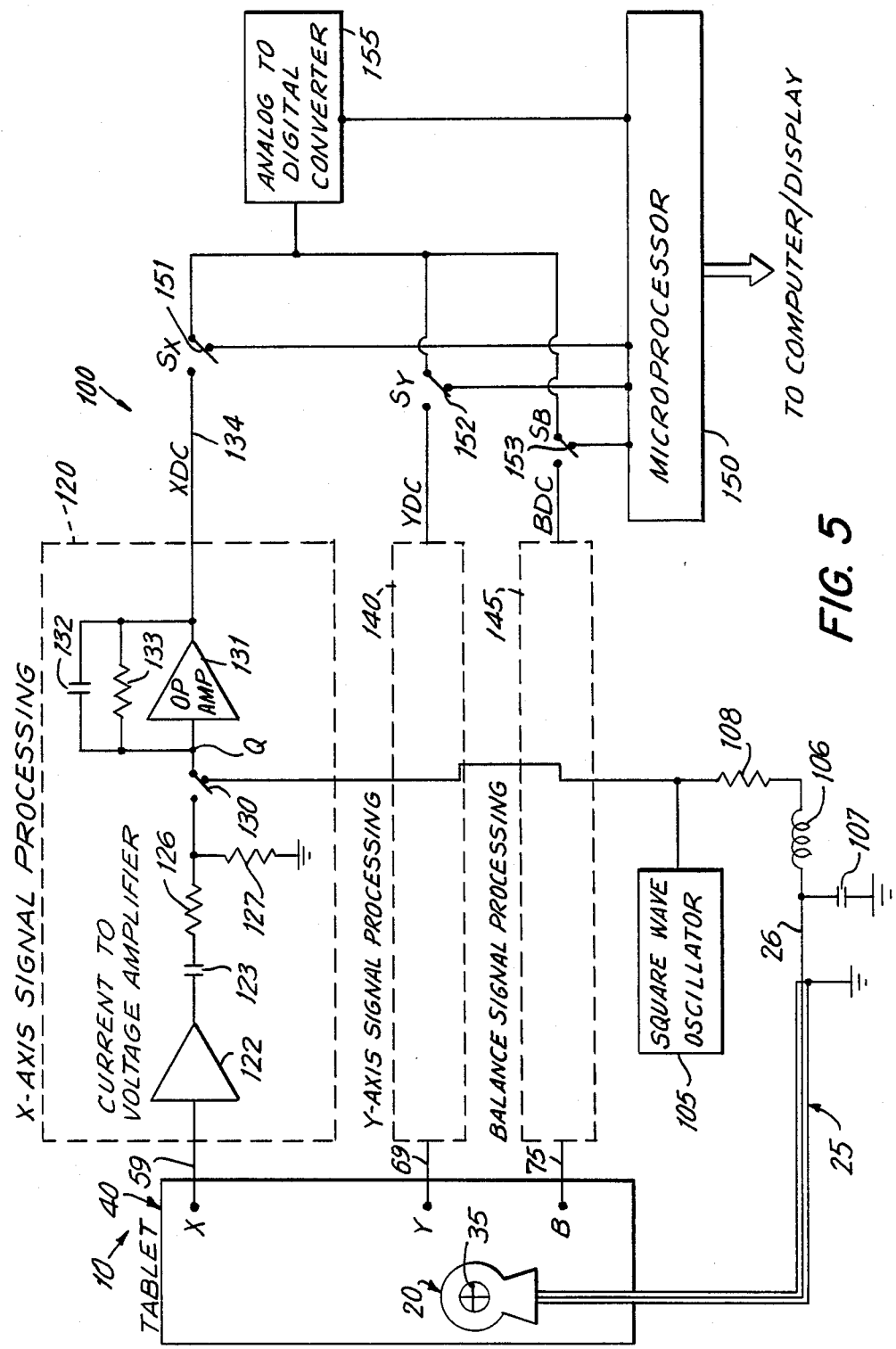
FIG. 5 is a semi-schematic diagram of the processing circuitry used with the tablet/cursor system depicted in FIGS. 1-4 in accordance with the preferred embodiment wherein the cursor or stylus is driven.

The electronic circuitry utilized in this embodiment of the wedge-and-strip digitizer is illustrated in block form in FIG. 5. The x coordinate is calculated from the signal coupled from the cursor 20 to the X electrode 50 and the summed signal coupled from the cursor 20 to the X, Y and B electrodes. The y coordinate is given by the signal coupled by the cursor 20 to the Y electrode 60 and the summed signal. The B electrode 70 provides a balance signal. The digital value $C_{sum}$, representing $A_{sum}-B_{sum}$ (see Eq. (5)), gives the strength or magnitude of the total signal coupled from the cursor 20. The $C_{sum}$ value will vary in dependence on the orientation of the coupling electrode of the cursor or stylus relative to the electrode layer 46 and the distance of the coupling electrodes from the electrode layer 46.

As already discussed, the absolute x and y coordinates are determined using Eqs. (1) and (2), where $X_{in}=2C_X/C_{sum}$ and $Y_{in}=2C_Y/C_{sum}$, $C_{sum}=C_X+C_Y+C_B$, and $C_X$, $C_Y$ and $C_B$ are respectively functions of the capacitively coupled signals output from the X, Y and B electrodes during driving of the coupling electrode of the cursor or stylus. This ratiometric measurement technique eliminates the error otherwise caused by variation in distance between the coupling electrode 30 and the electrode layer 44 of tablet 40.

Again referring to FIG. 5, the electronic circuitry for carrying out the foregoing ratiometric measurement comprises a square wave oscillator 105 providing a square wave output signal at a fixed frequency, preferably in the range of 10 kHz to 1 MHz. The square wave oscillator 105 drives a tuned LC circuit comprised of inductor 106 and capacitor 107, with the output signal of the square wave oscillator passing through a resistor 108 for limiting the loading on the oscillator 105. The tuned circuit elements 106 and 107 provide a multiple voltage gain to drive the coupling electrode 30 of cursor 20 through conductor 26 of cord or cable 25.

The driving signal on the coupling electrode 30 induces signals in the X, Y and B electrodes 50, 60, 70, with the strength of the signals induced in the X and Y electrodes being dependent upon the coordinate position of the cursor 20 on the tablet 40. More particularly, in accordance with the arrangement of the electrodes illustrated in FIG. 4, a greater Y electrode signal is provided when the cursor 20 is near the lower edge of the tablet, where the wedges of the Y electrode 60 are wider. Similarly, the X electrode signal is larger for cursor positions toward the right-hand side of the tablet shown in FIG. 4, where the strips of the X electrode 50 are wider.

The signals from the X, Y and B electrodes 50, 60, 70 are provided on conductors 59, 69, 75 respectively, and these signals are processed as illustrated in FIG. 5. The X electrode signal processing 120 is indicated in some detail, and it will be appreciated that the Y electrode signal processing circuitry 140 and the B electrode signal processing circuitry 145 are similar.

The signal from the X electrode 50, provided on conductor 59, is amplified by a charge amplifier 122 and this amplified signal passes through a band-pass filter including capacitor 123 and resistors 126, 127 to reject any 60 Hz frequency noise. This filter is centered at the drive frequency. This filtered AC signal is synchronously switched at the frequency of the square wave oscillator 105 by a switch 130, the filtered AC signal being applied through the switch 130 as the input to an operational amplifier 131.

By operating the switch 130 at the same frequency as the square wave oscillator 105, which is also generating the input signal to the cursor 20, noise or other pick-up at all other frequencies is rejected. This produces a very high signal-to-noise ratio and high accuracy in the determination of the coordinate position of the cursor 20 on the digitizer tablet 40.

A capacitor 132 and resistor 133 act as a filter to reduce AC ripple on the output of the operational amplifier 131, whereby a stable DC voltage signal indicative of the x coordinate of the cursor 20 is produced. The voltage gain is primarily determined by a ratio of the value of the resistor 133 to the value of the resistor 126.

The Y and B electrode signals are processed similarly. The outputs of the respective signal processing circuits are further processed in a microprocessor 150. More particularly, the signals are converted from analog values to digital values (i.e. $C_X$, $C_Y$, $C_{sum}$) via an analog-to-digital converter 155 which operates on the three signals sequentially by means of switches 151, 152, 153, which are controlled by the microprocessor 150. The rate of sampling may coincide with the report rate of the microprocessor 150 to the computer 2, typically 10–120 Hz. The microprocessor 150 calculates the coordinate position of the cursor in accordance with the ratiometric measurement technique, utilizing the background values $B_X$, $B_Y$ and $B_{sum}$ to compensate for noise and the offset, and utilizing correction factors $f_x$ and $f_y$ to compensate for resolution distortion as set forth above. The microprocessor 150 computes correction factors $f_x$ and $f_y$ using the data acquired from the phantom cursor.

Figure 9:
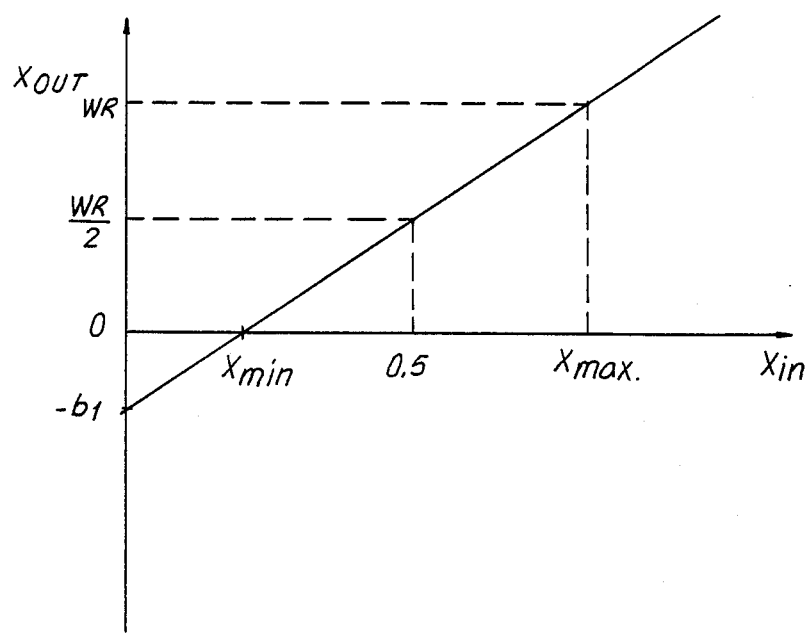
FIG. 9 is a graphical depiction of Eq. (6)

The calculation of the correction factors is based on the algorithm discussed below. The resolution R is defined as the number of counts per inch of tablet. (Note: In tablets having arrays of parallel lines, R is defined as the number of lines per inch.) The digitizer can be programmed to have whatever value R is required by the user. Assume a tablet having width w and height h, where w and h are given in inches. Then ideally the value representing the processed x coordinate, hereinafter referred to as $X_{out}$, will vary from 0 at x=0 to $R_w$ at x=w on the active area (see FiG. 9). Similarly the value representing the processed y coordinate, hereinafter referred to as $Y_{out}$, will vary from 0 at y=0 to Rh at y=h on the active area.

Assuming that $X_{in}$=0.5 and $Y_{in}$=0.5 at the center point of the data tablet ($x_{ctr}$=w/2, $Y_{ctr}$=h/2), and that $X_{in}$ and $Y_{in}$ at the position on the tablet overlying the phantom cursor ($x_{p.c.}$, $y_{p.c.}$) are respectively equal to $X_{in}$ and $Y_{in}$, then the counts $X_{out}$ and $Y_{out}$ at any point P on the table can be calculated in accordance with the following equations:

$$X_{out} = X_{range} X_{in} - b_1 \tag{6}$$

$$Y_{out} = Y_{range} Y_{in} - b_2 \tag{7}$$

where $X_{in}$ and $Y_{in}$ are computed in accordance with Eqs. (1)–(5), $$X_{range} = kRf_x = kR \frac{x_d}{(X_{in}^{ctr} - X_{in}^{p.c})} = kR \frac{x_d}{(0.5 - X_{in}^{p.c})} \tag{8}$$

$$Y_{range} = kRf_y = kR \frac{y_d}{(Y_{in}^{ctr} - Y_{in}^{p.c})} = kR \frac{y_d}{(0.5 - Y_{in}^{p.c})} \tag{9}$$

$x_d = x_{ctr} - x_{p.c.} = w/2 - x_{p.c.}$, $y_d = y_{ctr} - y_{p.c.} = h/2 - y_{p.c.}$, k is a constant, and $b_1$ and $b_2$ are the values representing the signals respectively induced in or by the X and Y electrodes when the stylus or cursor is respectively located over the margins x=0 and y=0. $X_{out}$ and $Y_{out}$ are respectively values corresponding to the x and y coordinates of the cursor or stylus.

During the calibration cycle (i.e. stylus disabled and phantom cursor enabled), the microprocessor acquires the values $C_X$, $C_Y$ and $C_B$, which are used to calculate $X_{in}$ and $Y_{in}$. The correction factors $f_x$ and $f_y$ are then computed using $X_{in}^{p.c}$ and $Y_{in}^{p.c}$ and the stored data for $x_{ctr}$, $y_{ctr}$, $x_{p.c.}$, $y_{p.c.}$, $X_{in}^{ctr}$, and $Y_{in}^{ctr}$. Upon calculation of the correction factors $f_x$ and $f_y$ and selection of the resolution R, the microprocessor can compute $X_{range}$ and $Y_{range}$, as shown in FIG. 11B. During a part of the digitization cycle for which the stylus and the phantom cursor are disabled, the values $B_X$, $B_Y$ and $B_{sum}$ (i.e. the background readings) are obtained. During the part of the digitization cycle for which the stylus is enabled, the X, Y and B electrodes are driven in accordance with a predetermined pattern, as a result of which the microprocessor acquires $A_X$, $A_Y$ and $A_{sum}$ dependent on the location P of the stylus on the active area of the tablet. The microprocessor then computes $X_{in}$ and $Y_{in}$. At this point the microprocessor has all the information necessary to calculate $X_{out}$ and $Y_{out}$ in accordance with Eqs. (6) and (7) for each point P during travel of the stylus or cursor on the tablet surface.

In an alternative embodiment of a wedge-and-strip type digitizer, a stylus of the type comprising a coupling electrode in the shape of a ring or other suitable shape surrounding a pointer of pen-like shape may be used in place of the cursor 20, if desired, provided that the stylus electrode is sufficiently spaced from the electrode layer 46. Thereby an averaging effect with respect to any particular strip or wedge is achieved.

In the preferred embodiment of the invention, the electrodes 50, 60, 70 and associated menu electrodes (not shown) of the digitizer tablet 40 are driven by a square wave oscillator in sequence and signals coupled to the cursor are provided to the electronic circuit shown in FIGS. 6A and 6B for processing on a sequential basis to determine the x, y coordinates of the cursor position on the tablet 40 or alternatively to determine the function or mode selected by the user from the menu (not shown).

A phantom cursor electrode 240 is arranged on the printed circuit board for the processing electronics shown in FIGS. 6A and 6B. The rest of the processing circuitry is shielded from the electrode 44 by a shielding layer (not shown). The phantom cursor electrode is located such that it can be capacitively coupled a portion of the electrode layer 44 near a corner of the tablet. The center of the phantom cursor electrode has predefined x, y coordinates. The phantom cursor electrode comprises a circular conductive plate opposing electrode layer 44, with an air space therebetween, and has dimensions such that the plate underlies at least one wedge and one strip. The phantom cursor 240 is also indicated by the dashed circle on the tablet of FIG. 3. It should be understood that the size of the phantom cursor, although enlarged relative to the tablet dimensions in FIG. 3, is shown in a roughly accurate scale relative to the widths of the wedges and strips. This is due to the fact that the wedges and strips are also not shown in their true size relationship to the tablet. Although a tablet may, for example, be 12 inches on a side, the base of each wedge is, for example, only 0.021 inch and the diameter of the phantom cursor is 0.042 inch in working prototypes. Thus, each digitizer tablet in accordance with the invention has many more wedges and strips than the number depicted in FIG. 3.

The phantom cursor electrode 240 is directly connected to the digitizer electronics by line C1 as shown in FIG. 6A. The area and contours of the phantom cursor electrode need not correspond with the area and shape of the coupling electrode 30 in the cursor 20 because the quantities of concern are the ratios $C_X$ and $C_X$ to $C_{sum}$. In the preferred embodiment, the phantom cursor electrode takes the form of a circular plate, although other regular shapes would be suitable, e.g. a square.

The digitizer tablet is expanded to include a menu in addition to the coordinate determination area, as fully disclosed in U.S. patent application Ser. No. 28,495. This menu comprises a plurality of menu electrodes which are respectively driven by the same driving signals which drive the X, Y and B electrodes. Although the menu electrodes arranged in an expanded tablet could be connected to junctions along conductors 50, 69, 75 (FIG. 3), in the preferred embodiment, the menu electrodes and X, Y and B electrodes are connected to a zebra strip arrangement as detailed below.

Figure 7:
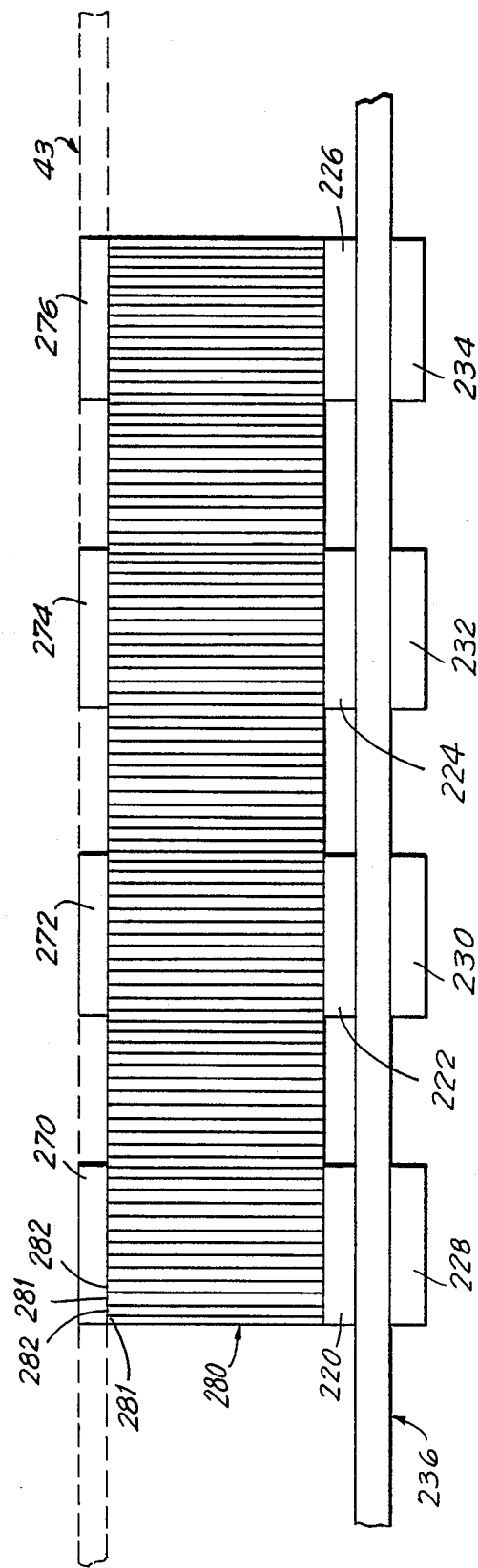
FIG. 7 is an enlarged side view of the zebra strip arrangement for connecting the electronics printed circuit board and the tablet.

FIG. 7 shows the preferred connection between the digitizer electronics 100 and the digitizer tablet 40 in accordance with the invention. In contrast to the embodiment depicted in FIGS. 1 and 3, the digitizer electronics and tablet are not connected by a multi-line cable, but rather are connected by a zebra strip 280 which consists of a multitude of alternating conducting and insulating layers 281 and 282 stacked in sandwich fashion. Each layer is made of flexible material, e.g. metal foil and plastic. A first plurality of the conducting layers 281 of zebra strip 280 connect conductive junction electrodes 220 and 270, a second plurality connect conductive junction electrodes 222 and 272, a third plurality connect conductive junction electrodes 224 and 274, and a fourth plurality connect conductive junction electrodes 226 and 276. Each junction electrode comprises a conductive plate. The junction electrodes 220, 222, 224 and 226 are respectively connected to driving circuits 214, 216, 218 and ground (see FIG. 6A). The driving signals from driving circuits 214, 216 and 218 are conducted by junction electrodes 220, 222 and 224 respectively, by zebra strip 280, and by junction electrodes 270, 272, and 274 respectively.

The junction electrodes 270, 272 and 274 in the preferred embodiment are respectively electrically connected to the X, B and Y electrodes. Junction electrodes 270, 272 and 274 are also respectively electrically connected to the menu electrodes (not shown).

The junction electrodes 220, 222, 224 and 226 are mounted on the printed circuit board 236 of the digitizer electronics 100. Printed circuit board 236 is made of dielectric material. On the other side of P.C. board 236, conductive plates 228, 230, 232 and 234 are arranged in opposition to junction electrodes 220, 222, 224 and 226 respectively. The respective pairs of opposing plates separated by the dielectric P.C. board 236 form an array of capacitors. Therefore, when the driving signals from driving circuits 214, 216 and 218 pass through junction electrodes 220, 222 and 224 respectively, corresponding signals are capacitively induced in plates 228, 230 and 232 respectively.

The structure of the hardware according to the preferred embodiment of the invention will now be described in detail with reference to FIGS. 6A and 6B.

The digitizer electronics includes a microprocessor 200 comprising an 8031 chip manufactured by Intel. However, it would be obvious to those of ordinary skill in the art that other 8-bit microprocessors could be substituted for the 8031 chip. Microprocessor 200 controls driving of the X, Y and B electrodes, mode selection, integration of the cursor output signal, transmission of the position coordinates, and resetting and enabling of the counting, switching, latching and memory chips to be described in detail below.

Pins P0.0 to P0.7 of microprocessor 200 are connected to pins D1-D8 of buffer 204. The address logic enable (ALE) pin of microprocessor 200 is connected to the latch enable (LE) pin of buffer 204. The output terminals Q1-Q8 of buffer 204 (i.e. pins Q1-Q8) are respectively connected to pins A0-A7 of external memory chip 206. Pins P2.0-P2.4 of microprocessor 200 are respectively connected to pins A8-A12 of external memory chip 206. The output terminals (i.e. pins Q0-Q7) of memory chip 206 are respectively connected to the lines of data bus 202. The lines of data bus 202 are respectively connected to the lines connecting microprocessor 200 and buffer 204. Pin PSEN of microprocessor 200 is connected to the output enable (OE) pin of external memory chip 206. External memory chip 206 has program instructions stored therein. A listing of some of these program instructions is annexed hereto as Appendices A and B. These program instructions respectively correspond to the flowcharts depicted in FIGS. 9 and 10, to be discussed in detail hereinafter.

The lines of data bus 202 are also respectively connected to the output terminals (i.e. pins Q1-Q8) of buffer chip 208. The output enable (OC) pin of buffer chip 208 is connected to the read (RD) pin of microprocessor 200. The input terminals (i.e. pins D1-D8) of buffer chip 208 are respectively connected to the output terminals (i.e. pins Q1-Q8) of counter 210. The reset terminal (R) of counter 210 is connected to pin P1.6 of microprocessor 200. Pin CLK of counter 210 receives clocking signals from oscillator 201 by way of AND gate 250.

Oscillator 201 is also connected to the CLK pin of counter 212. Clock 212 divides the 11.0592-MHz signal from oscillator 201 and outputs an 86-kHz signal at pin Q7. This 86-kHz signal takes the form of a square wave oscillation which is directly provided to drivers 214, 216 and 218. Drivers 214, 216 and 218 are respectively connected to conductive plates (i.e. junction electrodes) 220, 222 and 224 arranged on one side of the printed circuit board. A fourth conductive plate 226 is connected to ground.

As clearly shown in FIG. 7, conductive plates 220, 222, 224 and 226 are respectively opposed by conductive plates 228, 230, 232 and 234. These opposing plates form the anode and cathode of respective capacitors and are separated by a layer of dielectric material 236. The conductive plates 228, 230, 232 and 234 are connected in series to pin 15 of switching circuit 238.

The phantom cursor 240 is connected to pin 4 of switching chip 238. The stylus or cursor is connected to terminal 3 of connector J2, which is in turn directly linked to pin 14 of switching chip 238. Switching circuit 238 is switched under the control of microprocessor 200 such that a selected one or neither of the signals received at pins 4 and 14 is output to the negative terminal of preamplifier 242. The switching state of switching chip 238 will depend on the control bit data received at pins 9, 10, and 11, which are directly connected to output pins Q5, Q6 and Q7 of latching chip 244.

Latching chip 244 receives an eight-bit signal (at pins D1-D8) from microprocessor 200 by way of data bus 202. As previously mentioned, three bits of this eight-bit signal control the switching stage of switching chip 238. Three other bits control which of the driving circuits 214, 216 and 218 will be activated. The latch enable (LE) pin of latching circuit 244 is directly connected to the write (WR) pin of microprocessor 200.

The output of preamplifier 242 is connected to the positive terminal of amplifier 246. The output terminal of amplifier 246 is in turn connected to the negative terminal of amplifier 248 by way of switch SW1 of switching circuit 250. The output terminal of amplifier 248 is connected to the positive terminal of comparator 252. The output terminal of amplifier 248 is fed back to the negative input terminal by way of capacitor C33. Amplifier 248 and capacitor C33 form an integrator. The output terminal of comparator 252 is connected to the clocking terminal CLK of counter 210. In response to the signal from amplifier 248 attaining a predetermined level, comparator outputs a signal which stops the clocking of counter 210. The output terminal of comparator 252 is also connected to pin P1.4 of microprocessor 200.

The switching circuit 250 comprises four switches SW1-SW4 which are effectively controlled by microprocessor 200. For example, pin 12 of switching circuit 250, which controls switch SW4, is directly connected to pin P1.7 of microprocessor 200. Pin 5 of switching circuit 250, which controls switch SW3, is directly connected to pin 3.5 of microprocessor 200. Pin 6 of switching circuit 250, which controls switch SW2, is connected to pin P1.6 by way of driver 254. Finally, pin 13 of switching circuit 250, which controls switch SW1, is connected to AND gate 256, the input terminals of which are operatively connected to pin Q7 of counter 212 and pin P0.0 of microprocessor 200 by way of latching circuit 244. Switching circuit 250 controls the charging, discharging and resetting of capacitor C33, which is connected in parallel with amplifier 248.

EEPROM 258 is connected to pins P1.0-P1.3 of microprocessor 200. This programmable memory provides the capability for storing special routines to be executed by the microprocessor.

Finally, the transmit (TXD) pin of microprocessor 200 is connected to pin C of level shifter 262. Pin Z of level shifter 262 is connected to terminal 7 of jack J1. Terminal 7 is utilized to transmit signals in accordance with the RS232 protocol to an external device. Pin TXD of microprocessor 200 is also connected to terminal 4 of jack J1 by way of inverter 264. Terminal 4 of jack J1 is used to transmit data to a TTL device. The receive (RXD) terminal of microprocessor 200 is connected to port 5 of jack J1 by way of resistor R18 and inverter 266.

The calibration of a wedge-and-strip type digitizer in accordance with the invention will now be described in detail with reference to FIGS. 8-10, 11A and 11B.

The digitizer electronics 100 is capable of operating in two different modes: (1) processing the signals received from the cursor or stylus (the digitization mode); and (2) processing the data signals received from the phantom cursor (the calibration mode). In these modes, the respective signals from the stylus and the phantom cursor are induced in response to the driving signals.

A typical sampling cycle in the digitization mode (see FIG. 8) includes at least the following: (1) driving of the X electrode alone and sampling of the cursor or stylus output signal; (2) driving of the X, Y and B electrodes simultaneously and sampling of the cursor or stylus output signal; and (3) driving of the Y electrode alone and sampling of the cursor or stylus output signal. If a pressure-sensitive stylus is used in conjunction with the tablet, then the stylus output signal can be sampled during a fourth sampling cycle to determine the amplitude of a signal which is a function of the pressure being exerted on the stylus tip. The output signal from the stylus is transmitted to input pin 14 of switching chip 238 (see FIG. 6A). In switching chip 238, the signal from the stylus is switched to either output pin 12 or 13 depending on the control signal (see STYLUS OUTPUT SWITCH CONTROL signal in FIG. 8) received by switching chip 238 at pin 11 for latching chip 244. When the stylus output control signal is high, input pin 14 is connected to output pin 12, whereby the stylus output signal is transmitted to preamplifier 242. When the stylus output control signal is low, input pin 14 is connected to output pin 13, whereby the stylus output signal is transmitted directly to amplifier 248. As can be seen in FIG. 8, the stylus output in response to the X, SUM and Y driving cycles is switched to preamplifier 242 and the stylus output in response to the pressure pulse sent to the stylus is switched to amplifier 248. In a fifth sampling cycle, one or more of the X, Y and B electrodes are driven and the signal input into amplifier 248 is measured for the purpose of determining the level of background noise. During this fifth sampling cycle, the stylus output switch control signal is low.

The sampling cycle for the preferred embodiment of FIGS. 6A and 6B is shown in FIG. 8. The period of each cycle is 13.9 ms. The output of the integrator (amplifier 248 and capacitor C33) is shown in the top portion of FIG. 8. First, the X electrode is driven for a time T and then the capacitor C33 discharges. The counter 210 starts to count when the capacitor C33 starts to discharge and counter 210 stops when the integrator output attains a predetermined level. Second the X, Y and B electrodes are driven simultaneously for a time T/2, following which capacitor C33 again discharges. Again the counter 210 measures the time of discharge. Third, the Y electrode is driven for a time T and the discharge time of capacitor C33 is measured by counter 210.

For these first three stages, the stylus is enabled, i.e. capacitively induced current is output from the stylus. In the fourth and fifth stages, the stylus is disabled and no capacitively induced current is output from the stylus.

In the fourth stage and pressure being exerted on the tip of the stylus by the user is measured. This stage is only necessary in those applications where the coordinates of a stylus is being used. The coordinates are acquired for those positions of the stylus at which the stylus is being pressed with at least a predetermined pressure against the tablet. In particular, pressure information is required when a stylus and tablet are used in connection with a signature verification system.

In the fifth stage, a background reading is taken while the stylus is disabled and while one or more of the electrodes are driven. Due to inherent and environmental noise and an offset reflecting the difference between the reference potentials of the integrator (VR1) and the comparator (VR2), even when no capacitively induced current is output from the stylus, the capacitor C33 will have charge stored therein, which charge will produce a finite discharge time. Since the discharge time is being used as a measure of the signal output from the stylus, the finite discharge time due to noise and the offset must be subtracted from the actual discharge time measured when the stylus is enabled. This finite discharge time is represented by the counts $B_X$, $B_Y$ and $B_{sum}$ in Eqs. (3)–(5). In the cycle shown in FIG. 8, the background signal is being measured while only the X electrode is driven. In the next cycle (not shown), the background signal is measured while the X, Y and B electrodes are driven. And in the cycle following the next cycle (not shown), the background signal is measured while only the Y electrode is driven. These background readings are used to correct the respective $A_X$, $A_{sum}$ and $A_y$ values obtained in the first three stages of each cycle.

Figure 10:
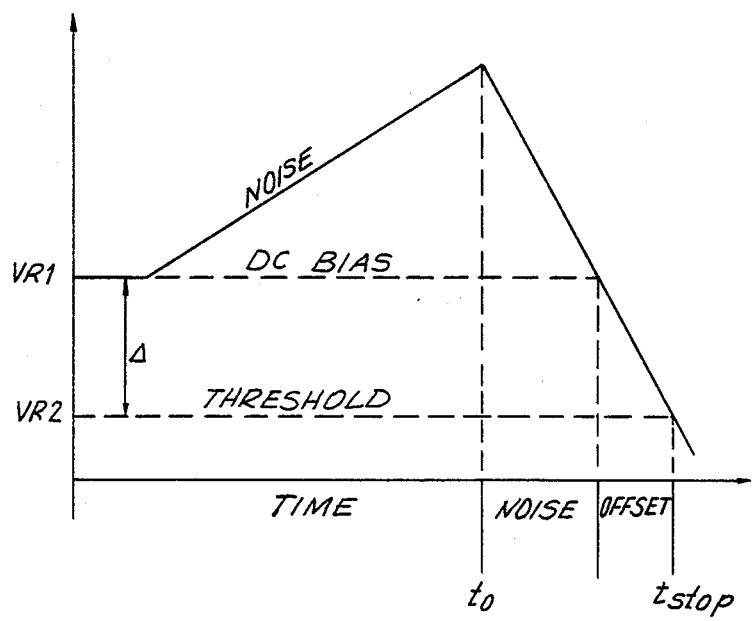
FIG. 10 is a graphical depiction of the integrator output during a background reading.

The output of the integrator during a background reading is graphically depicted in FIG. 10. At time $t_0$ the capacitor C33 is discharged in response to a discharge enable signal output from microprocessor 200 and the counter 210 is started. When the integrator output reaches the threshold level VR2, the comparator 252 outputs a signal which stops the counter at time $t_{stop}$. The digital value at which the counting is stopped (i.e. $t_{stop}$) will correspond to $B_X$, $B_Y$ or $B_{sum}$ depending on whether the X, the Y or the X, Y and B electrodes were driven prior to the background reading.

In response to successive driving of the X electrode alone, the X, Y and B electrodes simultaneously and the Y electrode alone, the values $C_X$, $C_{sum}$ and $C_Y$ are thus acquired. In theory, the ratios $2C_X/C_{sum}$ and $2C_Y/C_{sum}$ are used to determine the x and y coordinates of the cursor position. However, in practice the x and y coordinates obtained using these ratios deviate from the true coordinates of the cursor or stylus due to the aforementioned gaps between the electrodes. The data at any point and the relationships of data between points which are being digitized are modified by the space which is required between the electrodes in order to prevent electrical conduction between them. Discrepancies in results between actual digitizing and the results of calculation differ depending upon the gap spacing, whether it be, for example, 10 mil spacing, 15 mil spacing, etc. By placement of the phantom cursor 240, for example, near a corner of the tablet, at a precisely known spot, actual measured data can be combined with mathematically predicted data to determine the amount of resolution distortion due to the spacings. Correction factors can be computed in accordance with Eqs. (6)–(9). These factors, when applied to the incoming signals, correct the output data for the spacing or gap between the digitizer tablet electrodes 50, 60, 70. These correction factors allow manufacturing variability because the gap tends to be uniform over a given tablet electrode layer 46, but may differ in different production runs. Such differences in gap are readily compensated by means of the phantom cursor.

In summary, deviations between actual interelectrode spacing and mathematically predicted spacing are overcome by the use of a phantom cursor which is fixed at a permanent known position of the digitizer tablet 40. The phantom cursor 240, having a known position and known geometric relations between the X, Y and B electrodes at that position, provides correction factors which compensate for the physical gap which is necessary between the electrodes 50, 60, 70, to maintain separation between the electrical signals.

Figure 11A:
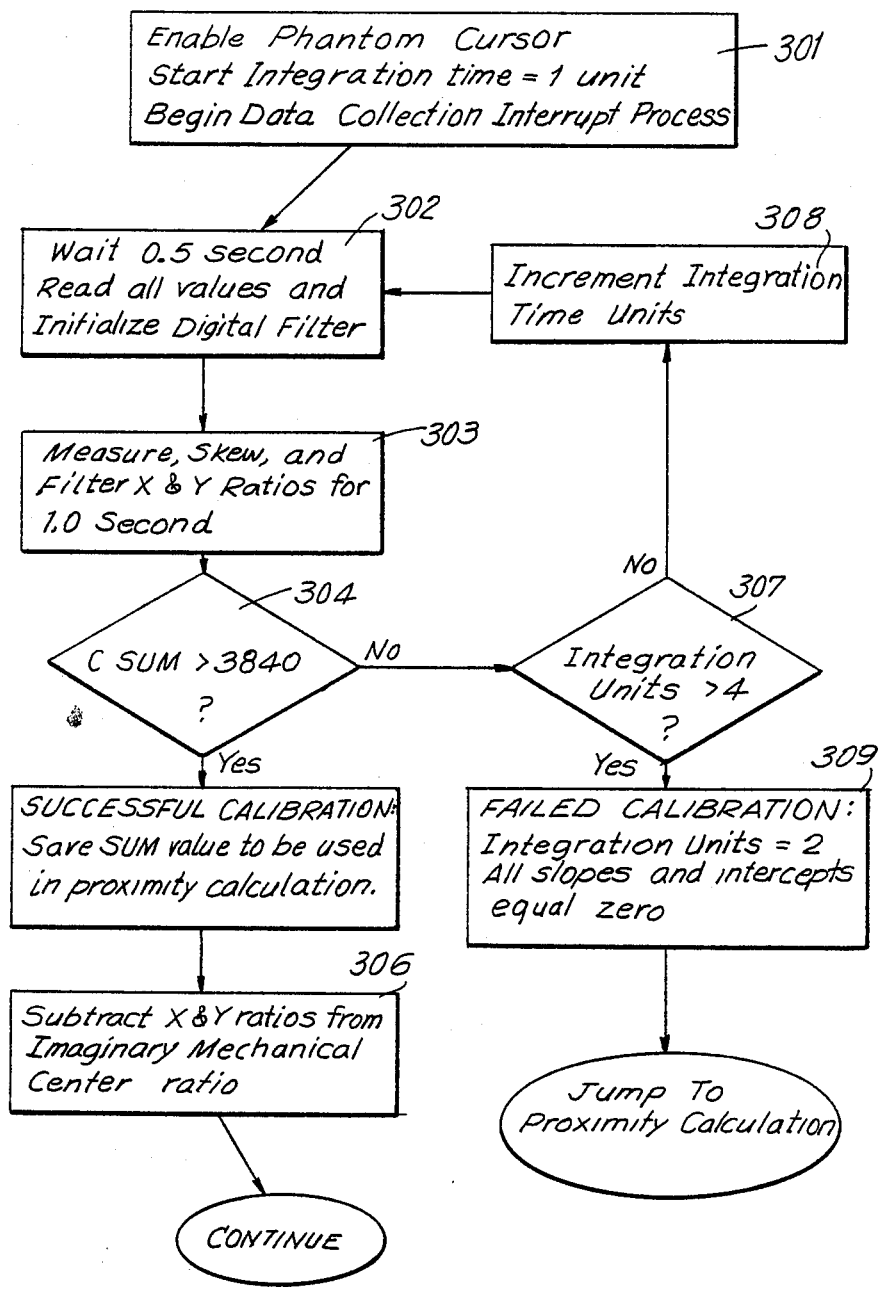
FIGS. 11A and 11B show the flowchart of the calibration routine incorporated in the charge ratio tablet in accordance with the invention.
Figure 11B:
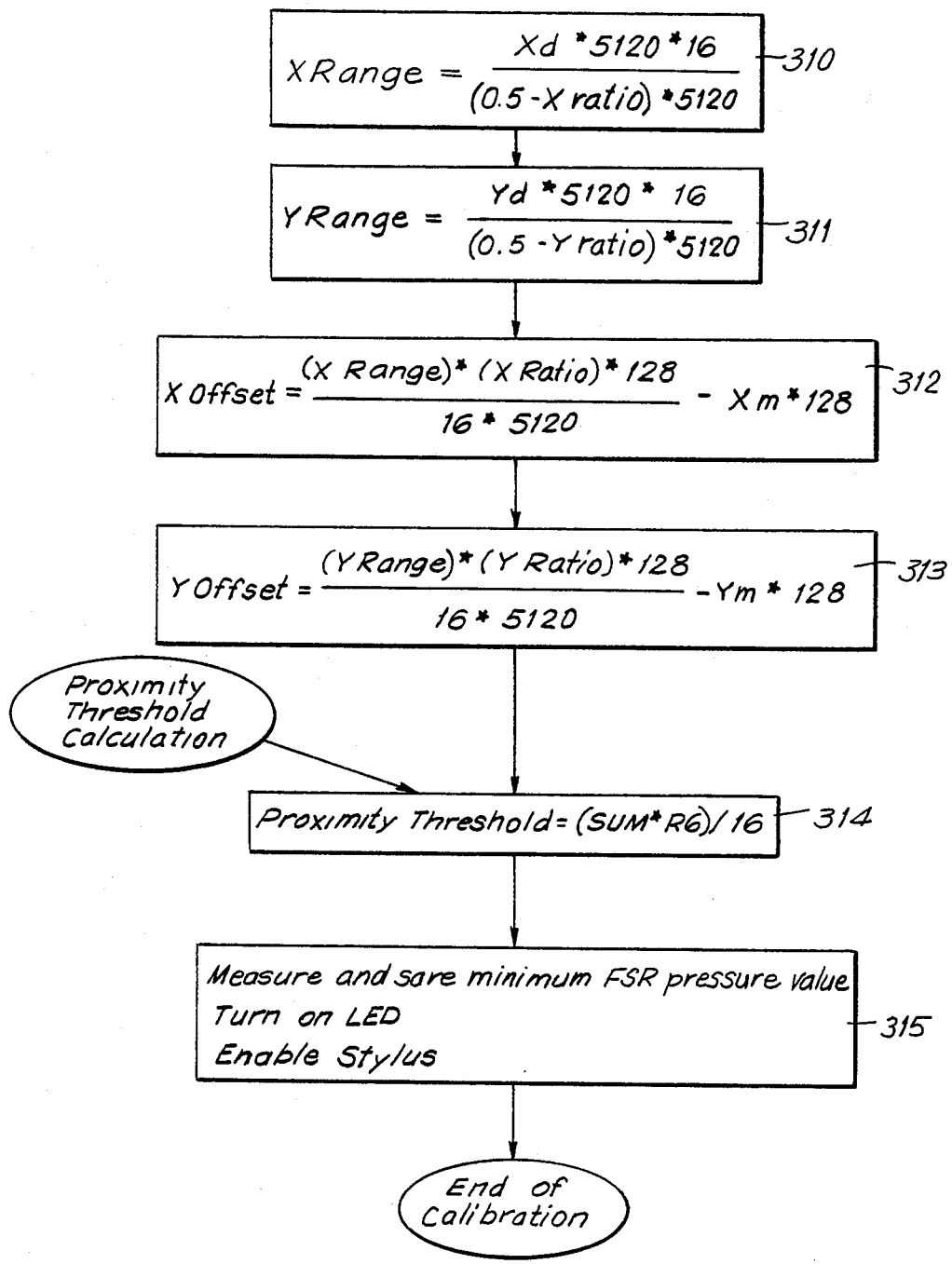

The flowchart of the calibration routine in accordance with the invention is shown in FIGS. 11A and 11B. The calibration routine itself is attached as Appendix B.

In the calibration mode the phantom cursor 240 is enabled (see block 301 in FIG. 11A) by a signal sent from latching chip 244 to switching chip 238 (see FIG. 6A). In response to this signal, switch 238 is switched to connect input pin 4 to output pin 3, which is connected to preamplifier 242. At the start the signals output from the phantom cursor are integrated for one unit of integration time (see block 301), which is the minimum amount of integration time, one unit being $T/2 = 277.8$ microseconds (see T/2 in FIG. 8). The count representing the discharge time is compared with a threshold level. This threshold level represents the minimum acceptable signal magnitude for achieving a predetermined signal-to-noise ratio.

The signals from the phantom cursor are obtained in response to the driving cycle shown in FIG. 8. The program listing for controlling the charging and discharging of capacitor C33 (FIG. 6B) during the driving cycle is annexed as Appendix A (lines 877–1208). The driving cycle is the same regardless of which capacitively coupled electrode (i.e. the stylus or the phantom cursor) is enabled.

The background readings $B_x$, $B_y$ and $B_{sum}$ are subtracted from the raw readings $A_x$, $A_y$ and $A_{sum}$, as already described (see lines 1218–1240 of Appendix A).

As indicated in block 302 of FIG. 11A, the microprocessor waits 0.5 second before reading the data in order to allow transients to die out.

After the 0.5 second delay, the data collection vectors of Appendix A are carried out 72 times in one second. The background-compensated X, Y and SUM readings are skew-corrected (see block 303). The 72 samples of skew-corrected background-compensated X, Y and SUM readings ($C_X$, $C_Y$ and $C_{sum}$) are then used to form the ratios $X_{in}$ and $Y_{in}$, which are then processed by a one-pole IIR digital low-pass filter. The digital filter filters out high-frequency changes in the digital values of the computed ratios, which high frequencies are due to noise. The final ratios are then stored when processing by the digital filter is completed.

In the next step (block 304), the stored $C_{sum}$ value is tested to determine if it is greater than a predetermined value (e.g. 3840) required to achieve a predetermined signal-to-nose ratio. If $C_{sum}$ is not greater than 3840, the program carries out step 307, whereby it is determined whether number of integration time units exceeds 4. As already noted, the initial number of integration time units is 1. Since the number of integration time units is not greater than 4 during this initial stage, the number of units is incremented by unity (block 308). Then the steps generally denoted by blocks 302-304 are repeated, this time with an integration time of 2 units, which will produce a greater value for $C_{sum}$. If $C_{sum}$ is still not greater than 3840, the integration time will be increased to 3 units, and if necessary, to 4 and then 5 units. If after an integration time of 5 units, the $C_{sum}$ value still fails to attain the minimum level (i.e. 3840), then the calibration is deemed to be a failure (block 309). The integration time is set equal to 2 units and the slopes and intercepts are set equal to zero. In this case, although the digitizer system will still be able to interface with the host computer, any position coordinate determined will be invalid.

If the $C_{sum}$ value meets the threshold requirement, the calibration is deemed successful and the $C_{sum}$ value is stored for later use in the "out of proximity" calculation (block 305).

Thereafter the $X_{in}$ and $Y_{in}$ values (referred to as the X ratio and Y ratio respectively in FIGS. 11A and 11B) are subtracted from $X^{ctr}$ and $Y^{ctr}$ respectively (block 306).

The calibration continues as shown in FIG. 11B. The $X_{range}$ and $Y_{range}$ values are calculated in accordance with the equations in blocks 310 and 311 respectively, where $x_d$ and $y_d$ are the differences between the x and y coordinates respectively of the mechanical center of the tablet and the phantom cursor (see lines 1563-1579 of Appendix B). $X_{range}$ and $Y_{range}$ are the factors used in accordance with Eqs. (6) and (7) to compensate for resolution distortion. In addition, the $X_{offset}$ and $Y_{offset}$ values are calculated in accordance with the equations in blocks 312 and 313. $X_{offset}$ and $Y_{offset}$ are factors used to tell the microprocessor where the margins of the active coordinate determination area should be located.

Next the "out of proximity" threshold level is computed in accordance with the equation in block 314. R6 is an initial number which can be adjusted up or down, as disclosed in U.S. patent application Ser. No. 28,495 entitled MENU FOR A CHARGE RATIO DIGITIZER, now U.S. Pat. No. 4,788,386.

Finally, a residual reading of the pressure is taken when no pressure is being applied on the stylus. This residual reading is stored and later subtracted from the reading obtained when the stylus is being pressed against the tablet, whereby a reading representing the true pressure is obtained.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

APPENDIX A

```
                873   ; ****************************************************
                874   ;         DATA COLLECTION INTERRUPT VECTORS
                875   ; ****************************************************
                876   ;
                877   ; ------------------------START OF X CHARGE-----------------
                878   ;
02C9  748C      879        XXX:   MOV    A,#01000110B     ;
02CB  4530      880               ORL    A,MASK           ;
02CD  F8        881               MOV    R0,A             ;SAVE
02CE  08        882               INC    R0               ;
02CF  A209      883               MOV    C,PHLAGS.1       ;LED FLAG
02D1  92E7      884               MOV    ACC.7,C          ;
02D3  F2        885               MOVX   @R0,A            ;ENABLE X DRIVE SIGNAL
02D4  9002EE    886               MOV    DPTR,#XXC        ;BUMP POINTER
02D7  EE        887               MOV    A,R6             ;
02D8  5403F     888               ANL    A,#63            ;
02DA  23        889               RL     A                ;
02DB  FC        890               MOV    R4,A             ;X=FULL CHARGE TIME
02DC  30B3FD    891               JNB    P3.3,$           ;SYNCHRONIZE
                892   ;
02DF  741C      893               MOV    A,#28            ;- - - - - - - - - -
02E1  14        894        X1:    DEC    A                ;    TIME DELAY
02E2  70FD      895               JNZ    X1               ;- - - - - - - - - -
02E4  E8        896               MOV    A,R0             ;
02E5  A209      897               MOV    C,PHLAGS.1       ;LED FLAG
02E7  92E7      898               MOV    ACC.7,C          ;
02E9  C297      899               CLR    P1.7             ;UNCLAMP INTEGRATOR
02EB  F2        900               MOVX   @R0,A            ;START INTEGRATING
02EC  81A5      901        XJT:   AJMP   TINC             ;
                902   ;
                903   ;
                904   ;
                905   ;
                906   ;
                907   ; -----------END X CHARGE / START X DISCHARGE----------
                908   ;
02EE  DCFC      909        XXC:   DJNZ   R4,XJT           ;JUMP IF CHARGE NOT DONE
02F0  900314    910               MOV    DPTR,#XXD        ;BUMP POINTER
02F3  740E      911        XXQ:   MOV    A,#00000110B     ;TURN OFF DRIVE SIGNALS
02F5  4530      912               ORL    A,MASK           ;SELECT SOURCE
```

```
02F7 F8           913              MOV    R0,A           ;HOLD
02F8 30B3FD       914              JNB    P3.3,$         ;SYNCHRONIZE
                  915       ;
02FB 741C         916              MOV    A,#28          ;- - - - - - - - - -
02FD 14           917       X2:    DEC    A              ;     TIME DELAY
02FE 70FD         918              JNZ    X2             ;- - - - - - - - - -
0300 E8           919              MOV    A,R0           ;TURN OFF SYNC SWITCH
0301 A209         920              MOV    C,PHLAGS.1     ;LED FLAG
0303 92E7         921              MOV    ACC.7,C        ;
0305 C2B5         922              CLR    P3.5           ;OPEN PRESURE SWITCH
0307 F2           923              MOVX   @R0,A          ;STOP INTEGRATING
0308 7406         924              MOV    A,#6           ;- - - - - - - - - -
030A 14           925       X3:    DEC    A              ;     TIME DELAY
030B 70FD         926              JNZ    X3             ;- - - - - - - - - -
030D 758A00       927              MOV    TL0,#0         ;CLEAR HI BYTE
0310 C296         928              CLR    P1.6           ;START DISCHARGE
0312 81A5         929              AJMP   TINC           ;
                  930       ;
                  931       ;
                  932       ;
                  933       ;
                  934       ;
                  935       ;---------END X DISCHARGE / START SUM CHARGE---------
                  936       ;
0314 20941B       937       XXD:   JB     P1.4,XJM       ;JUMP IF COMPARATOR HI
0317 7480         938              MOV    A,#10000000B   ;
0319 4530         939              ORL    A,MASK         ;
031B F8           940              MOV    R0,A           ;SAVE
031C 08           941              INC    R0             ;
031D A209         942              MOV    C,PHLAGS.1     ;LED FLAG
031F 92E7         943              MOV    ACC.7,C        ;
0321 F2           944              MOVX   @R0,A          ;ENABLE SUM DRIVE SIGNAL
                  945       ;
0322 E2           946              MOVX   A,@R0          ;READ LO COUNTER
0323 F538         947              MOV    NEWXLO,A       ;
0325 858A39       948              MOV    NEWXHI,TL0     ;READ HI COUNTER
0328 4390FE       949              ORL    P1,#254        ;RESET COUNTER+INTEGRATOR
032B 900344       950              MOV    DPTR,#YYY      ;BUMP POINTER
032E EE           951              MOV    A,R6           ;R6=INTEGRATION TICKS
032F 543F         952              ANL    A,#63          ;
0331 FC           953              MOV    R4,A           ;SUM = HALF CHARGE TIME
0332 30B3FD       954              JNB    P3.3,$         ;SYNCHRONIZE
                  955       ;
0335 741C         956              MOV    A,#28          ;- - - - - - - - - -
0337 14           957       Y1:    DEC    A              ;     TIME DELAY
0338 70FD         958              JNZ    Y1             ;- - - - - - - - - -
033A E8           959              MOV    A,R0           ;
033B A209         960              MOV    C,PHLAGS.1     ;LED FLAG
033D 92E7         961              MOV    ACC.7,C        ;
033F C297         962              CLR    P1.7           ;UNCLAMP INTEGRATOR
0341 F2           963              MOVX   @R0,A          ;START INTEGRATING
0342 81A5         964       XJM:   AJMP   TINC           ;
                  965       ;
                  966       ;
                  967       ;
                  968       ;
                  969       ;
                  970       ;---------END SUM CHARGE / START SUM DISCHARGE---------
                  971       ;
0344 DCFC         972       YYY:   DJNZ   R4,XJM         ;JUMP IF CHARGE NOT DONE
0346 90034B       973              MOV    DPTR,#YYD      ;BUMP POINTER
0349 41F3         974              AJMP   XXD            ;
                  975       ;
                  976       ;
                  977       ;
                  978       ;
                  979       ;
                  980       ;---------END SUM DISCHARGE / START Y CHARGE---------
                  981       ;
034B 209441       982       YYD:   JB     P1.4,BCM       ;JUMP IF COMPARATOR HI
034E 7486         983              MOV    A,#10000110B   ;
0350 4530         984              ORL    A,MASK         ;
0352 F8           985              MOV    R0,A           ;SAVE
0353 08           986              INC    R0             ;
0354 A209         987              MOV    C,PHLAGS.1     ;LED FLAG
0356 92E7         988              MOV    ACC.7,C        ;
0358 F2           989              MOVX   @R0,A          ;ENABLE Y DRIVE SIGNAL
```

```
                990   ;
                991   ;
                992   ;HERE THE CHANGE IN SUCESSIVE SUM VALUES IS MONITORED. IF
                993   ;THE DIFFERENCE IS TOO LARGE THE BAD DATA FLAG IS SET.
                994   ;
0359 E2         995         MOVX   A,@R0              ;READ LO COUNTER
035A F53C       996         MOV    NEWBLO,A           ;
035C E58A       997         MOV    A,TL0              ;
035E 4390FE     998         ORL    P1,#254            ;RESET COUNTER+INTEGRATOR
                                        NEWBHI  9/4/59
0361 C53D   999→*          XCH    A,NEWBH            ;
0363 2541      1000         ADD    A,SBCKRH           ;OLD+BACKROUND
0365 953D      1001         SUBB   A,NEWBHI           ;OLD+BACKROUND- NEW VAL
0367 30E702    1002         JNB    ACC.7,ABSV         ;JUMP IF POSITIVE
036A F4        1003         CPL    A                  ;
036B 04        1004         INC    A                  ;CONVERT TO POSITIVE
036C 24FD      1005  ABSV:  ADD    A,#-3              ;IS DIFFERENCE > 2 ?
036E 20E706    1006         JB     ACC.7,BMPTR        ;JUMP IF NO
0371 200A03    1007         JB     PHLAGS.2,BMPTR     ;JUMP IF BACKROUND OFF
0374 5324F0    1008         ANL    GDATA,#240         ;RESET GOOD DATA COUNTER
               1009   ;
0377 900391    1010  BMPTR: MOV    DPTR,#BBB          ;BUMP POINTER
037A EE        1011         MOV    A,R6                ;
037B 543F      1012         ANL    A,#63              ;
037D 23        1013         RL     A                  ;
037E FC        1014         MOV    R4,A               ;Y = FULL CHARGE TIME
037F 30B3FD    1015         JNB    P3.3,$             ;SYNCHRONIZE
               1016   ;
0382 741C      1017         MOV    A,#28              ;- - - - - - - - - -
0384 14        1018  B1:    DEC    A                  ;   TIME DELAY
0385 70FD      1019         JNZ    B1                 ;- - - - - - - - - -
0387 E8        1020         MOV    A,R0               ;
0388 A209      1021         MOV    C,PHLAGS.1         ;LED FLAG
038A 92E7      1022         MOV    ACC.7,C            ;
038C C297      1023         CLR    P1.7               ;UNCLAMP INTEGRATOR
038E F2        1024         MOVX   @R0,A              ;START INTEGRATING
038F 81A5      1025  BCM:   AJMP   TINC               ;
               1026   ;
               1027   ;
               1028   ;
               1029   ;
               1030   ;
               1031   ;---------END Y CHARGE / START Y DISCHARGE-----------
               1032   ;
0391 DCFC      1033  BBB:   DJNZ   R4,BCM             ;JUMP IF CHARGE NOT DONE
0393 900398    1034         MOV    DPTR,#PPP          ;BUMP POINTER
0396 41F3      1035         AJMP   XXQ                ;
               1036   ;
               1037   ;
               1038   ;
               1039   ;
               1040   ;
               1041   ;---------END Y DISCHARGE / START PRESSURE CHARGE--------
               1042   ;
0398 2094F4    1043  PPP:   JB     P1.4,BCM           ;JUMP IF COMPARATOR HI
039B 74CE      1044         MOV    A,#11001110B       ;
039D A209      1045         MOV    C,PHLAGS.1         ;LED FLAG
039F 92E7      1046         MOV    ACC.7,C            ;
03A1 F2        1047         MOVX   @R0,A              ;TURN OFF STYLUS
               1048   ;
03A2 E2        1049         MOVX   A,@R0              ;READ LO COUNTER
03A3 F53A      1050         MOV    NEWYLO,A           ;
03A5 858A3B    1051         MOV    NEWYHI,TL0         ;READ HI COUNTER
03A8 4390FE    1052         ORL    P1,#254            ;RESET COUNTER+INTEGRATOR
03AB 9003B9    1053         MOV    DPTR,#PNCD         ;BUMP POINTER
03AE 30B3FD    1054         JNB    P3.3,$             ;SYNCHRONIZE
               1055   ;
03B1 D2B5      1056         SETB   P3.5               ;CLOSE PRESSURE SWITCH
03B3 C297      1057         CLR    P1.7               ;UNCLAMP INTEGRATOR
03B5 7C02      1058         MOV    R4,#2              ;PRESSURE CHARGE TIME=FIX
03B7 81A5      1059         AJMP   TINC               ;
               1060   ;
               1061   ;
               1062   ;
               1063   ;
               1064   ;
               1065   ;--END OF PRESSURE CHARGE / START OF PRESSURE DISCHARGE--
               1066   ;
```

```
03B9 DC0F        1067         FNCD:   DJNZ   R4,POUT         ;JUMP IF CHARGE NOT DONE
03BB 9003CC      1068                 MOV    DPTR,#          ;BUMP POINTER
03BE 30B3FD      1069                 JNB    P3.3,$          ;SYNCHRONIZE
03C1 C2B5        1070                 CLR    P3.5            ;OPEN PRESSURE SWITCH
03C3 00          1071                 NOP                    ;
03C4 00          1072                 NOP                    ;
03C5 758A00      1073                 MOV    TL0,#0          ;CLEAR HI BYTE
03C8 C296        1074                 CLR    P1.6            ;START DISCHARGE
03CA 81A5        1075         POUT:   AJMP   TINC            ;
                 1076         ;
                 1077         ;
                 1078         ;
                 1079         ;
                 1080         ;
                 1081         ;----END PRESSURE DISCHARGE / START BACKROUND CHARGE----
                 1082         ;
03CC 2094FB      1083         RDPRS:  JB     P1.4,POUT       ;JUMP IF COMPARATOR HI
                 1084         ;
03CF EE          1085                 MOV    A,R6            ;
03D0 20E704      1086                 JB     ACC.7,XORY      ;JUMP IF X OR Y BACKROUND
03D3 74C0        1087                 MOV    A,#11000000B    ;ENABLE DRIVE,STYLUS OFF
03D5 8009        1088                 SJMP   READP           ;
03D7 20E604      1089         XORY:   JB     ACC.6,WYE       ;JUMP IF Y BACKROUND
03DA 74CC        1090                 MOV    A,#11001100B    ;ENABLE X DRIVE,STYLUS OFF
03DC 8002        1091                 SJMP   READP           ;
03DE 74C6        1092         WYE:    MOV    A,#11000110B    ;ENABLE Y DRIVE,STYLUS OFF
                 1093         
03E0 A209        1094         READP:  MOV    C,PHLAGS.1      ;LED FLAG
03E2 92E7        1095                 MOV    ACC.7,C         ;
03E4 F2          1096                 MOVX   @R0,A           ;TURN OFF STYLUS
03E5 D2E0        1097                 SETB   ACC.0           ;
03E7 F8          1098                 MOV    R0,A            ;SAVE
                 1099         ;
                 1100         ;
                 1101         ;
                 1102         ;THIS ROUTINE READS THE PRESSURE VALUE
                 1103         ;
03E8 E58A        1104                 MOV    A,TL0           ;READ HI BYTE
03EA 54F0        1105                 ANL    A,#11110000B    ;
03EC 6004        1106                 JZ     TAME            ;JUMP IF < 4096
03EE 7440        1107                 MOV    A,#64           ;MAX PRESSURE
03F0 800D        1108                 SJMP   NUFORC          ;
                 1109         ;
03F2 E2          1110         TAME:   MOVX   A,@R0           ;READ LOW BYTE
03F3 54E0        1111                 ANL    A,#11100000B    ;
03F5 458A        1112                 ORL    A,TL0           ;READ HI BYTE
03F7 23          1113                 RL     A               ;
03F8 23          1114                 RL     A               ;
03F9 23          1115                 RL     A               ;
03FA C3          1116                 CLR    C               ;
03FB 9D          1117                 SUBB   A,R5            ;SUBTRACT OFFSET
03FC 5001        1118                 JNC    NUFORC          ;JUMP IF DIFF > 0
03FE E4          1119                 CLR    A               ;CLAMP TO ZERO
03FF F52E        1120         NUFORC: MOV    FORCE,A         ;SAVE
                 1121         ;
                 1122         ;
0401 4390FE      1123                 ORL    P1,#254         ;RESET COUNTER+INTEGRATOR
0404 900422      1124                 MOV    DPTR,#BEC       ;BUMP POINTER
0407 30B3FD      1125                 JNB    P3.3,$          ;SYNCHRONIZE
                 1126         ;
040A 741C        1127                 MOV    A,#28           ;- - - - - - - -
040C 14          1128         B4:     DEC    A               ;    TIME DELAY
040D 70FD        1129                 JNZ    B4              ;- - - - - - - -
                 1130         ;
040F E8          1131                 MOV    A,R0            ;
0410 A209        1132                 MOV    C,PHLAGS.1      ;LED FLAG
0412 92E7        1133                 MOV    ACC.7,C         ;
0414 C297        1134                 CLR    P1.7            ;UNCLAMP INTEGRATOR
0416 F2          1135                 MOVX   @R0,A           ;INTEGRATE BACKROUND

0417 EE          1136                 MOV    A,R6            ;
0418 A2E7        1137                 MOV    C,ACC.7         ;
041A 543F        1138                 ANL    A,#63           ;
041C 5001        1139                 JNC    BCT             ;JUMP IF HALF BACKROUND
041E 23          1140                 RL     A               ;
041F FC          1141         BCT:    MOV    R4,A            ;BACKROUND CHARGE
0420 81A5        1142         BAJ:    AJMP   TINC            ;
                 1143         ;
```

```
                 1144   ;
                 1145   ;
                 1146   ;
                 1147   ;
                 1148   ;------END OF BACKROUND CHARGE / START DISCHARGE------
                 1149   ;
0422 DCFC        1150   BEC:    DJNZ    R4,BAJ          ;JUMP IF CHARGE NOT DONE
0424 900429      1151           MOV     DPTR,#BEDD      ;BUMP POINTER
0427 41F3        1152           AJMP    XXQ             ;
                 1153
                 1154   ;
                 1155   ;
                 1156   ;
                 1157   ;
                 1158   ;--------------END BACKROUND DISCHARGE----------------
                 1159   ;
0429 2094F4      1160   BEDD:   JB      P1.4,BAJ        ;JUMP IF COMPARATOR HI
                 1161   ;
042C EE          1162           MOV     A,R6             ;
042D B2E7        1163           CPL     ACC.7           ;ALTERNATE FULL/HALF
042F FE          1164           MOV     R6,A             ;
0430 30E713      1165           JNB     ACC.7,FULL      ;FULL BACKROUND IF LO
                 1166   ;
0433 E2          1167   HALF:   MOVX    A,@R0           ;READ LO COUNTER
0434 2540        1168           ADD     A,SBCKRL        ;-----------------------
0436 F540        1169           MOV     SBCKRL,A        ;
0438 E58A        1170           MOV     A,TL0           ;
043A 3541        1171           ADDC    A,SBCKRH        ;       AVERAGE
043C 13          1172           RRC     A                ;   NEW SUM & OLD SUM
043D F541        1173           MOV     SBCKRH,A        ;       BACKROUND
043F E540        1174           MOV     A,SBCKRL        ;
0441 13          1175           RRC     A                ;
0442 F540        1176           MOV     SBCKRL,A        ;-----------------------
0444 802A        1177           SJMP    PFNND           ;
                 1178   ;
0446 B2E6        1179   FULL:   CPL     ACC.6           ;
0448 FE          1180           MOV     R6,A             ;
0449 30E613      1181           JNB     ACC.6,YBACK     ;JUMP IF Y BACKROUND
                 1182   ;
044C E2          1183   XBACK:  MOVX    A,@R0           ;READ LO COUNTER
044D 2542        1184           ADD     A,XBCKRL        ;-----------------------
044F F542        1185           MOV     XBCKRL,A        ;
0451 E58A        1186           MOV     A,TL0           ;
0453 3543        1187           ADDC    A,XBCKRH        ;       AVERAGE
0455 13          1188           RRC     A                ;    NEW X & OLD X
0456 F543        1189           MOV     XBCKRH,A        ;       BACKROUND
0458 E542        1190           MOV     A,XBCKRL        ;
045A 13          1191           RRC     A                ;
045B F542        1192           MOV     XBCKRL,A        ;-----------------------
045D 8011        1193           SJMP    PFNND           ;
                 1194   ;
045F E2          1195   YBACK:  MOVX    A,@R0           ;READ LO COUNTER
0460 2544        1196           ADD     A,YBCKRL        ;-----------------------
0462 F544        1197           MOV     YBCKRL,A        ;
0464 E58A        1198           MOV     A,TL0           ;
0466 3545        1199           ADDC    A,YBCKRH        ;       AVERAGE
0468 13          1200           RRC     A                ;    NEW Y & OLD Y
0469 F545        1201           MOV     YBCKRH,A        ;       BACKROUND
046B E544        1202           MOV     A,YBCKRL        ;
046D 13          1203           RRC     A                ;
046E F544        1204           MOV     YBCKRL,A        ;-----------------------
                 1205   ;
0470 4390FE      1206   PFNND:  ORL     P1,#254         ;RESET COUNTER+INTEGRATC
0473 900478      1207           MOV     DPTR,#SUBTB     ;BUMP POINTER
0476 81A5        1208           AJMP    TINC            ;
                 1209   ;
                 1210   ;
                 1211   ;
                 1212   ;
                 1213   ;
                 1214   ;---------------- SUBTRACT BACKROUND VALUES ------------
                 1215   ;
0478 200A27      1216   SUBTB:  JB      PHLAGS.2,BKDONE ;JUMP IF NO BACKROUND
                 1217   ;
047B E538        1218           MOV     A,NEWXLO        ;- - - - - - - - - -
047D C3          1219           CLR     C                ;
047E 9542        1220           SUBB    A,XBCKRL        ;
```

```
0480 F538      1221            MOV     NEWXLO,A        ;SUBTRACT X BACKROUND
0482 E539      1222            MOV     A,NEWXHI        ;
0484 9543      1223            SUBB    A,XBCKRH        ;
0486 F539      1224            MOV     NEWXHI,A        ;- - - - - - - - - -
               1225    ;

0488 E53A      1226            MOV     A,NEWYLO        ;- - - - - - - - - -
048A C3        1227            CLR     C               ;
048B 9544      1228            SUBB    A,YBCKRL        ;
048D F53A      1229            MOV     NEWYLO,A        ;SUBTRACT Y BACKROUND
048F E53B      1230            MOV     A,NEWYHI        ;
0491 9545      1231            SUBB    A,YBCKRH        ;
0493 F53B      1232            MOV     NEWYHI,A        ;- - - - - - - - - -
               1233    ;

0495 E53C      1234            MOV     A,NEWBLO        ;- - - - - - - - - -
0497 C3        1235            CLR     C               ;
0498 9540      1236            SUBB    A,SBCKRL        ;
049A F53C      1237            MOV     NEWBLO,A        ;SUBTRACT SUM BACKROUND
049C E53D      1238            MOV     A,NEWBHI        ;
049E 9541      1239            SUBB    A,SBCKRH        ;
04A0 F53D      1240            MOV     NEWBHI,A        ;- - - - - - - - - -
               1241    ;
04A2 9004A5    1242    BKDONE: MOV     DPTR,#TINC      ;BUMP POINTER
               1243    ;
               1244    ;
               1245    ;
               1246    ;
               1247    ;
               1248    ;
04A5 19        1249    TINC:   DEC     R1              ;
04A6 E9        1250            MOV     A,R1            ;
04A7 5403      1251            ANL     A,#3            ;
04A9 7005      1252            JNZ     RAATE           ;
04AB 431903    1253            ORL     TMMRMS,#3       ;EVERY 233 MICROSECONDS
04AE D2AC      1254            SETB    IE.4            ;ENABLE SERIAL INTERRUPT
               1255    ;
04B0 74FC      1256    RAATE:  MOV     A,#-4           ;
04B2 29        1257            ADD     A,R1            ;
04B3 F9        1258            MOV     R1,A            ;
04B4 54FC      1259            ANL     A,#252          ;
04B6 7009      1260            JNZ     PERIOD          ;
04B8 4319F0    1261            ORL     TMMRMS,#240     ;RESET EVERY 16.67 MS
               1262    ;
04BB DA04      1263            DJNZ    R2,PERIOD       ;
04BD AA37      1264            MOV     R2,RATE         ;REFILL RATE COUNTER
04BF D224      1265            SETB    GDATA.4         ;
04C1 DB05      1266    PERIOD: DJNZ    R3,GOUT         ;EVERY 13.89 MILLISECOND
04C3 7B32      1267            MOV     R3,#50          ;RESET TICK COUNTER
04C5 9002C9    1268            MOV     DPTR,#XXX       ;RESET POINTER
               1269    ;
04C8 EF        1270    GOUT:   MOV     A,R7            ;RESTORE ACCUMULATOR
04C9 8535D0    1271            MOV     PSW,SAVONE      ;RESTORE STATUS REGISTER
04CC 32        1272            RETI                    ;
```

APPENDIX B

```
               1466    ;***********************************************
               1467    ;              CALIBRATION ROUTINE
               1468    ;***********************************************
               1469    ;
               1470    ;
05AB 7405      1471            MOV     A,#5            :
               1472    ;
05AD F508      1473            MOV     OLDXVL,A        ;- - - - - - - - -
05AF F509      1474            MOV     OLDXVH,A        ;
05B1 F50A      1475            MOV     OLDYVL,A        ;
05B3 F50B      1476            MOV     OLDYVH,A        ;   FILTER VALUES
05B5 F50C      1477            MOV     LASTXL,A        ;1285=5120 * .251
05B7 F50D      1478            MOV     LASTXH,A        ;
05B9 F50E      1479            MOV     LASTYL,A        ;
05BB F50F      1480            MOV     LASTYH,A        ;- - - - - - - - -
               1481    ;
05BD 751D00    1482            MOV     PRESUR,#0       ;
05C0 751E01    1483            MOV     CHRGT,#1        ;
05C3 753050    1484            MOV     MASK,#01010000B ;SELECT PSUEDO STYLUS
05C6 900301    1485            MOV     DPTR,#XXX       ;INITIALIZE POINTER
05C9 75A894    1486            MOV     IE,#10010100B   ;ENABLE INTERRUPTS
               1487    ;
               1488
```

```
                    1489    ;THIS ROUTINE MEASURES THE SUM SIGNAL FROM THE ON-BOARD
                    1490    ;CALIBRATION SPOT AND DETERMINES THE CORRECT VALUE OF
                    1491    ;CHARGE TIME FOR USE WITH THE STYLUS.
                    1492    ;
05CC  752524        1493    CALBR8: MOV     BUFER1,#36      ;NUMBER OF CYCLES
                    1494
05CF  E51B          1495    SC1:    MOV     A,TICKCT        ;-------------------
05D1  B405FB        1496            CJNE    A,#5,SC1        ;
05D4  E51B          1497    SC2:    MOV     A,TICKCT        ;    .5 SECOND
05D6  B402FB        1498            CJNE    A,#2,SC2        ;      DELAY
05D9  D525F3        1499            DJNZ    BUFER1,SC1      ;
05DC  120AE3        1500            LCALL   SKEW            ;-------------------
05DF  F133          1501            ACALL   NOAVG           ;LOAD INITIAL CONDITIONS
                    1502    ;
                    1503    ;
05E1  752548        1504            MOV     BUFER1,#72      ;NUMBER OF CYCLES
05E4  E51B          1505    SC3:    MOV     A,TICKCT        ;-------------------
05E6  B404FB        1506            CJNE    A,#4,SC3        ;
05E9  120AE3        1507            LCALL   SKEW            ;
05EC  D1F4          1508            ACALL   AVERGE          ;
05EE  B11C          1509            ACALL   XRATIO          ;    1.0 SECOND
05F0  1208B9        1510            LCALL   XFLTR           ;    FILTER TIME
05F3  AA48          1511            MOV     R2,YSIGLO       ;
05F5  AB49          1512            MOV     R3,YSIGHI       ;
05F7  B120          1513            ACALL   XANDY           ;
05F9  1208FE        1514            LCALL   YFLTR           ;
05FC  D525E5        1515            DJNZ    BUFER1,SC3      ;-------------------
                    1516    ;
05FF  B209          1517            CPL     PHLAGS.1        ;TOGGLE LED
0601  E54F          1518            MOV     A,SUMHI         ;
0603  24F1          1519            ADD     A,#-15          ;IS SUM > 3840 ?
0605  30E717        1520            JNB     ACC.7,GOOD      ;JUMP IF YES
0608  051E          1521            INC     CHRGT           ;
060A  E51E          1522            MOV     A,CHRGT         ;
060C  540F          1523            ANL     A,#15           ;LOWER NIBBLE ONLY
060E  B405BB        1524            CJNE    A,#5,CALBR8     ;JUMP IF UNDER LIMIT
                    1525    ;
                    1526    ;
0611  E4            1527    FAIL:   CLR     A               ;
0612  F529          1528            MOV     XXRF,A          ;
0614  F52A          1529            MOV     XXOF,A          ;
0616  F52B          1530            MOV     YYRF,A          ;
0618  F52C          1531            MOV     YYOF,A          ;
061A  751E0A        1532            MOV     CHRGT,#2+8      ;
061D  C1B3          1533            AJMP    PRXTH           ;
                    1534    ;
                    1535    ;
061F  D214          1536    GOOD:   SETB    STATUS.4        ;SUCESSFUL CALIBRATION
0621  854E25        1537            MOV     BUFER1,SUMLO    ;
0624  854F26        1538            MOV     BUFER2,SUMHI    ;SAVE
                    1539    ;
                    1540    ;
                    1541    ;THE FOLLOWING ROUTINES CALCULATE THE RANGE AND OFFSET
                    1542    ;FACTORS FOR BOTH THE X AND Y AXIS.
                    1543    ;
0627  7400          1544            MOV     A,#0            ;
0629  C3            1545            CLR     C               ;
062A  950C          1546            SUBB    A,LASTXL        ;
062C  F550          1547            MOV     MXL,A           ;
062E  740A          1548            MOV     A,#10           ;
0630  950D          1549            SUBB    A,LASTXH        ;
0632  F551          1550            MOV     MXH,A           ;SUBTRACT FROM 2560
                    1551    ;
0634  7400          1552            MOV     A,#0            ;
0636  C3            1553            CLR     C               ;
0637  950E          1554            SUBB    A,LASTYL        ;
0639  F552          1555            MOV     MYL,A           ;
063B  740A          1556            MOV     A,#10           ;
063D  950F          1557            SUBB    A,LASTYH        ;
063F  F553          1558            MOV     MYH,A           ;SUBTRACT FROM 2560
                    1559    ;
                    1560    ;
                    1561    ;
                    1562    ;
                    1563    ;                               I..Xd..I
```

```
1564   ;       -------------------------    --
1565   ;      |                          |  Ym
1566   ;      |              +           |  --
1567   ;      |                          |  :
1568   ;      |                          |  :
1569   ;      |                          |  Yd
1570   ;      |                          |  :
1571   ;      |              +           |  --
1572   ;      |                          |
1573   ;      |                          |
1574   ;      |                          |
1575   ;      |                          |
1576   ;      |                          |
1577   ;      |                          |
1578   ;       -------------------------
1579   ;                          |.Xm.|
1580   ;
1581   ;
1582   ;
1583   ;NOTE: IF THE DISTANCE FROM THE CENTER TO THE CALIBRATION
1584   ;      SPOT IS TOO MUCH THEN THE RESOLUTION WILL BE TOO
1585   ;      HIGH. IF THE MARGIN DISTANCE IS TOO MUCH THEN THE
1586   ;      ACTIVE AREA WILL BE SHIFTED TOO MUCH TO THE RIGHT
1587   ;
1588   ;
1589   ;DIVIDEND = (16) * (5120) * (Xd DISTANCE)
1590   ;
```

|  |  |  |  |  |  |
|---|---|---|---|---|---|
| 0641 7F00 | 1591 | | MOV | R7,#0 | ; |
| 0643 7E06 | 1592 | | MOV | R6,#6 | ; |
| 0645 7D5C | 1593 | | MOV | R5,#92 | ; |
| 0647 7CCC | 1594 | | MOV | R4,#204 | ;5.09 * 81920 = 416972 |
| 0649 85504E | 1595 | | MOV | SUMLO,MXL | ; |
| 064C 85514F | 1596 | | MOV | SUMHI,MXH | ; |
| 064F B127 | 1597 | | ACALL | KDIV | ; |
| 0651 8C29 | 1598 | | MOV | XXRF,R4 | ;X RANGE FACTOR |
| 0653 9240 | 1599 | | MOV | EXTRA.0,C | ;SAVE 8th BIT |
| 0655 13 | 1600 | | RRC | A | ; |
| 0656 9241 | 1601 | | MOV | EXTRA.1,C | ;SAVE 9th BIT |

```
1602   ;
1603   ;DIVIDEND = (16) * (5120) * (Yd DISTANCE)
1604   ;
```

|  |  |  |  |  |  |
|---|---|---|---|---|---|
| 0658 7F00 | 1605 | | MOV | R7,#0 | ; |
| 065A 7E06 | 1606 | | MOV | R6,#6 | ; |
| 065C 7DB8 | 1607 | | MOV | R5,#184 | ; |
| 065E 7C00 | 1608 | | MOV | R4,#00 | ;5.373 * 81920 = 440320 |
| 0660 85524E | 1609 | | MOV | SUMLO,MYL | ; |
| 0663 85534F | 1610 | | MOV | SUMHI,MYH | ; |
| 0666 B127 | 1611 | | ACALL | KDIV | ; |
| 0668 8C2B | 1612 | | MOV | YYRF,R4 | ;Y RANGE FACTOR |
| 066A 9244 | 1613 | | MOV | EXTRA.4,C | ;SAVE 8th BIT |
| 066C 13 | 1614 | | RRC | A | ; |
| 066D 9245 | 1615 | | MOV | EXTRA.5,C | ;SAVE 9th BIT |

```
1616   ;
1617   ;
1618   ;X SHIFT = (128) * (Xm MARGIN)
1619   ;
```

|  |  |  |  |  |  |
|---|---|---|---|---|---|
| 066F AA0C | 1620 | | MOV | R2,LASTXL | ; |
| 0671 AB0D | 1621 | | MOV | R3,LASTXH | ; |
| 0673 A829 | 1622 | | MOV | R0,XXRF | ; |
| 0675 E4 | 1623 | | CLR | A | ; |
| 0676 A241 | 1624 | | MOV | C,EXTRA.1 | ; |
| 0678 33 | 1625 | | RLC | A | ; |
| 0679 A240 | 1626 | | MOV | C,EXTRA.0 | ; |
| 067B 33 | 1627 | | RLC | A | ; |
| 067C F9 | 1628 | | MOV | R1,A | ; |
| 067D 754E80 | 1629 | | MOV | SUMLO,#128 | ; |
| 0680 754F02 | 1630 | | MOV | SUMHI,#2 | ;DIVIDE BY 640 |
| 0683 B124 | 1631 | | ACALL | KRUNCH | ; |
| 0685 EC | 1632 | | MOV | A,R4 | ; |
| 0686 C3 | 1633 | | CLR | C | ; |
| 0687 945C | 1634 | | SUBB | A,#92 | ;SUBTRACT X SHIFT |
| 0689 F52A | 1635 | | MOV | XXOF,A | ;X OFFSET FACTOR |
| 068B ED | 1636 | | MOV | A,R5 | ; |
| 068C 9400 | 1637 | | SUBB | A,#0 | ; |
| 068E 13 | 1638 | | RRC | A | ; |
| 068F 9242 | 1639 | | MOV | EXTRA.2,C | ;SAVE 8th BIT |

```
0691 13         1640            RRC     A           ;
0692 9243       1641            MOV     EXTRA.3,C   ;SAVE 9th BIT
                1642    ;
                1643    ;Y SHIFT = (128) * (Ym MARGIN)
                1644    ;
0694 AA0E       1645            MOV     R2,LASTYL   ;
0696 AB0F       1646            MOV     R3,LASTYH   ;
0698 A82B       1647            MOV     R0,YYRF     ;
069A E4         1648            CLR     A           ;
069B A245       1649            MOV     C,EXTRA.5   ;
069D 33         1650            RLC     A           ;
069E A244       1651            MOV     C,EXTRA.4   ;
06A0 33         1652            RLC     A           ;
06A1 F9         1653            MOV     R1,A        ;
06A2 B124       1654            ACALL   KRUNCH      ;
06A4 EC         1655            MOV     A,R4        ;
06A5 C3         1656            CLR     C           ;
06A6 9464       1657            SUBB    A,#100      ;SUBTRACT Y SHIFT
06A8 F52C       1658            MOV     YYOF,A      ;Y OFFSET FACTOR
06AA ED         1659            MOV     A,R5        ;
06AB 9400       1660            SUBB    A,#0        ;
06AD 13         1661            RRC     A           ;
06AE 9246       1662            MOV     EXTRA.6,C   ;SAVE 8th BIT
06B0 13         1663            RRC     A           ;
06B1 9247       1664            MOV     EXTRA.7,C   ;SAVE 9th BIT
                1665    ;
                1666    ;
                1667    ;
                1668    ;
                1669    ;
                1670    ;
                1671    ;THIS LITTLE ROUTINE MULTIPLIES THE THRESHOLD VALUE BY
                1672    ;THE FRACTION (R6) / 16. TO RAISE THE PROX LEVEL MAKE
                1673    ;THE VALUE OF R6 SMALLER, TO LOWER THE PROX LEVEL MAKE
                1674    ;IT LARGER
                1675    ;
06B3 AC25       1676    PRXTH:  MOV     R4,BUFER1   ;
06B5 AD26       1677            MOV     R5,BUFER2   ;
06B7 7904       1678            MOV     R1,#4       ;
06B9 120A1F     1679            LCALL   DBYTWO      ;DIVIDE BY 16
06BC 7E14       1680            MOV     R6,#20      ;
06BE EC         1681            MOV     A,R4        ;
06BF F8         1682            MOV     R0,A        ;
06C0 ED         1683            MOV     A,R5        ;
06C1 F9         1684            MOV     R1,A        ;
06C2 1209F8     1685            LCALL   MULT6       ;MULTIPLY BY R6
06C5 8959       1686            MOV     THRESH,R1   ;
                1687    ;
                1688    ;
                1689    ;
                1690    ;
06C7 852E1D     1691            MOV     PRESUR,FORCE ;INITIALIZE MIN PRESSUR
06CA C209       1692            CLR     PHLAGS.1    ;TURN LED ON
06CC E4         1693            CLR     A           ;
06CD F524       1694            MOV     GDATA,A     ;
                1695    ;
06CF F530       1696            MOV     MASK,A      ;SELECT STYLUS
06D1 F526       1697            MOV     BUFER2,A    ;NO BEEP
                1698    ;
                1699    ;
```

What is claimed is:

1. In a digitizer comprising:

a digitizer tablet having a generally planar top surface and first and second electrodes lying in a plane parallel to said top surface, said first electrode having a first geometric pattern, said first pattern varying with a first coordinate in a two-coordinate system, and said second electrode having a second geometric pattern, said second pattern varying with the second coordinate in said two-coordinate system, said first and second electrodes being made of electrically conductive material; and a coupling means movable on said digitizer tablet top surface, said coupling means including a coupling electrode for electrostatic coupling with said first and second electrodes;

the improvement comprising a phantom cursor electrode fixedly arranged in said digitizer tablet and electrostatically coupled to said first and second electrodes, said phantom cursor electrode being arranged on the side of said plane opposite from said digitizer tablet top surface and having a point with predefined first and second coordinates;

signal generating means for outputting a driving electrical signal to one of said coupling electrode and said phantom cursor electrode, application of said driving signal causing electrostatic coupling of the driven electrode with said first and second electrodes;

electronic means for receiving and processing signals generated in said first and second electrodes in response to said driving signal to determine the first and second coordinates of a point on said coupling means when said coupling means is in proximity to said tablet; and switching means for sequentially connecting said phantom cursor electrode and said coupling electrode to said signal generating means for causing electrostatic coupling of first said phantom cursor electrode and then said coupling electrode with said first and second electrodes.

2. The digitizer as defined in claim 1, wherein a first dielectric layer separates said first and second electrodes from said coupling electrode when said coupling means is positioned on said tablet surface, and wherein a second dielectric layer separates said first and second electrodes from said phantom cursor electrode.

3. The digitizer as defined in claim 1, wherein said coupling means comprises a cursor.

4. The digitizer as defined in claim 1, wherein said coupling means comprises a stylus.

5. The digitizer as defined in claim 1, wherein said phantom cursor electrode comprises an electrically conductive plate.

6. The digitizer as defined in claim 1, wherein said first electrode is comprised of a plurality of wedge shaped portions and said second electrode is comprised of a plurality of strip shaped portions, and further comprising a third electrode serpentinely arranged and substantially filling the spaces between said first and second electrodes, except that said third electrode is separated from said first and second electrodes by spacing means comprising insulating material.

7. The digitizer as defined in claim 6, wherein said electronic means for receiving and processing signals is coupled to said first, second and third electrodes and comprises means for storing predetermined values based on the geometry of said first, second and third electrodes, means for comparing said predetermined values with processed values determined from actual signals generated in said first, second and third electrodes by said driven phantom cursor electrode, and means for generating correction factors proportional to deviations between said processed values and said predetermined values, said correction factors compensating for resolution distortion caused by said spacing means.

8. The digitizer as defined in claim 7, wherein said means for generating correction factors comprises a memory having a calibration routine stored therein.

9. The digitizer as defined in claim 7, wherein said electronic means further comprises means for computing the first and second coordinates of said point of said coupling means utilizing said correction factors.

10. In a digitizer tablet system comprising:
a first layer made of dielectric material and having a generally planar top surface,
a second layer having first and second electrodes lying in a plane parallel to said top surface, said first electrode having a first geometric pattern, said first pattern varying with a first coordinate in a two-coordinate system, and said second electrode having a second geometric pattern, said second electrode pattern varying with the second coordinate in said two-coordinate system, said first and second electrodes being made of electrically conductive material;

the improvement comprising
a phantom cursor electrode fixedly arranged in said digitizer tablet, a point on said phantom cursor electrode having predefined first and second coordinates, said phantom cursor electrode being arranged on the side of said plane opposite from said first layer;
said phantom cursor electrode and said second layer being separated by dielectric material, the thickness and dielectric characteristic of said dielectric material being such that said phantom cursor electrode is electrostatically coupled to said first and second electrodes.

11. The digitizer tablet system as defined in claim 10, further comprising:
signal generating means for outputting a driving electrical signal to said phantom cursor electrode, application of said driving signal causing electrostatic coupling of the phantom cursor electrode with said first and second electrodes; and
electronic means for receiving and processing signals generated in said first and second electrodes in response to said driving signal to determine digital values corresponding to measured first and second coordinates of said point on said phantom cursor electrode.

12. The digitizer tablet system as defined in claim 10, further comprising:
signal generating means for outputting a driving electrical signal to said first and second electrodes, application of said driving signal causing electrostatic coupling of said first and second electrodes with said phantom cursor electrode; and
electronic means for receiving and processing signals generated in said phantom cursor electrode in response to said driving signal to determine digital values corresponding to measured first and second coordinates of said point on said phantom cursor electrode.

13. The digitizer tablet system as defined in claim 10, wherein said phantom cursor electrode comprises an electrically conductive plate.

14. The digitizer tablet system as defined in claim 10, wherein said first electrode is comprised of a plurality of wedge shaped portions and said second electrode is comprised of a plurality of strip shaped portions, and further comprising a third electrode serpentinely arranged and substantially filling the spaces between said first and second electrodes, except that said third electrode is separated from said first and second electrodes by spacing means comprising insulating material.

15. The digitizer tablet system as defined in claim 14, wherein said electronic means for receiving and processing signals is coupled to said first, second and third electrodes and comprises means for storing predetermined values based on the geometry of said first, second and third electrodes, means for comparing said predetermined values with processed values determined from actual signals generated in said first, second and third electrodes by said driven phantom cursor electrode, and means for generating correction factors proportional to deviations between said processed values and said predetermined values, said correction factors compensating for resolution distortion caused by said spacing means.

16. In a digitizer comprising:

a digitizer tablet having a generally planar top surface and first and second electrodes lying in a plane parallel to said top surface, said first electrode having a first geometric pattern, said first pattern varying with a first coordinate in a two-coordinate system, and said second electrode having a second geometric pattern, said second pattern varying with the second coordinate in said two-coordinate system, said first and second electrodes being made of electrically conductive material;

a coupling means movable on said digitizer tablet top surface, said coupling means including a coupling electrode for electrostatic coupling with said first and second electrodes;

the improvement comprising a phantom cursor electrode fixedly arranged in said digitizer tablet at a known location for electrostatic coupling with said first and second elctrodes, said phantom cursor electrode being arranged on the side of said plane opposite from said digitizer tablet top surface and having a point with predetermined first and second coordinates;

signal generating means for outputting a driving electrical signal to at least one of said first and second electrodes, application of said driving signal causing electrostatic coupling of the driven electrode with said coupling electrode and said phantom cursor electrode;

electronic means for receiving and processing signals generated in said coupling electrode and said phantom cursor electrode in response to said driving signal to determine the first and second coordinates of a point on said coupling means when said coupling means is in proximity to said tablet; and switching means for sequentially connecting said phantom cursor electrode and said coupling electrode to said electronic means.

17. A method of calibrating a digitizer system including a wedge-and-strip type digitizer tablet, said tablet having a layer comprising a plurality of patterned electrodes for determining the coordinates of a movable coupling means placed on an operative surface of said tablet, each patterned electrode comprising electrically conductive material, said movable coupling means including a coupling electrode for electrostatically coupling with said patterned electrodes when at least one of said patterned electrodes is driven and said coupling means is in proximity to said operative surface, said tablet further including a fixed phantom cursor electrode comprising an electrically conductive plate, a first layer of dielectric material arranged between said patterned electrodes and said phantom cursor electrode, a second layer of dielectric material arranged between said patterned electrodes and said movable coupling means, signal generating means for outputting a driving electrical signal to at least one of said patterned elctrodes, electronic processing means for receiving and processing signals generated in said phantom cursor electrode and said coupling electrode in response to said driving signal to determine first and second coordinates of a point on said coupling means when said coupling means is in proximity to said tablet, and switching means for sequentially connecting said phantom cursor electrode and said coupling electrode to said electronic means, said method comprising the following steps:

(a) predefining the actual coordinates of a point on said phantom cursor electrode relative to a two-coordinate dimensional system on said operative surface;

(b) applying driving signals to said patterned electrodes in accordance with a predetermined sequence;

(c) measuring the signals generated in said phantom cursor electrode as the result of electrostatic coupling with said driven patterned electrodes;

(d) determining the measured coordinates of said point on said phantom cursor electrode relative to said two-coordinate dimensional system; and (e) forming first and second correction factors based on said actual and measured coordinates.

18. The method as defined in claim 17, further comprising the following steps:

(f) applying driving signals to said patterned electrodes in accordance with said predetermined sequence;

(g) measuring the signals generated in said coupling electrode as the result of electrostatic coupling with said driven patterned electrodes;

(h) determining the measured coordinates of a point on said coupling means relative to said two-coordinate dimensional system; and (i) computing the actual coordinates of said point on said coupling means relative to said two-coordinate dimensional system using said first and second correction factors, whereby resolution distortion due to the spacing between said patterned electrodes is compensated for.

19. A method of calibrating a digitizer system including a wedge-and-strip type digitizer tablet, said tablet having a layer comprising a plurality of patterned electrodes for determining the coordinates of a movable coupling means placed on an operative surface of said tablet, each patterned electrode comprising electrically conductive material, said movable coupling means including a coupling electrode for electrostatically coupling with said patterned electrodes when at least one of said coupling electrode is driven and is in proximity to said operative surface, said tablet further including a fixed phantom cursor electrode comprising an electrically conductive plate, a first layer of dielectric material arranged between said patterned electrodes and said phantom cursor electrode, a second layer of dielectric material arranged between said patterned electrodes and said proximal coupling means, signal generating means for outputting a driving electrical signal to at least one of said coupling and phantom cursor electrodes, electronic processing means for receiving and processing signals generated in said patterned electrodes in response to said driving signal to determine first and second coordinates of a point on said coupling means when said coupling means is in proximity to said tablet, and swtiching means for sequentially connecting said phantom cursor electrode and said coupling electrode to said signal generating means, said method comprising the following steps:

(a) predetermining the actual coordinates of a point on said phantom cursor electrode relative to a two-coordinate dimensional system on said operative surface;

(b) applying driving signals to said phantom cursor electrode in accordance with a predetermined sequence;
(c) measuring the signals generated in said patterned electrodes as the result of electrostatic coupling with said driven phantom cursor electrode;
(d) determining the measured coordinates of said point on said phantom cursor electrode relative to said two-coordinate dimensional system; and
(e) forming first and second correction factors based on said actual and measured coordinates.

20. The method as defined in claim 17, further comprising the following steps:
(f) applying driving signals to said coupling electrodes in accordance with said predetermined sequence;
(g) measuring the signals generated in said patterned electrodes as the result of electrostatic coupling with said driven coupling electrodes;
(h) determining the measured coordinates of a point on said coupling means relative to said two-coordinate dimensional system; and
(i) computing the actual coordinates of said point on said coupling means relative to said two-coordinate dimensional system using said first and second correction factors,
whereby resolution distortion due to the spacing between said patterned electrodes is compensated for.

21. A digitizer tablet system comprising: first and second electrodes lying in a plane, said first electrode having a first geometric pattern, said first pattern varying with a first coordinate in a two-coordinate system, and said second electrode having a second geometric pattern, said second pattern varying with the second coordinate in said two-coordinate system, said first and second electrodes being made of electrically conductive material;
signal generating means for outputting a driving signal to at least one of said first and second electrodes in response to a first enabling signal;
port means for receiving an analog signal from outside said tablet;
amplifying means for amplifying said analog signal;
switching means connected between said port means and said amplifying means for switchably enabling and disabling the sending of said analog signal from said port means to said amplifying means in response respectively to a second enabling signal and a disabling signal;
analog-to-digital conversion means connected to convert said amplified analog signal into a digital signal in response to a third enabling signal; and
control means connected to output control signals to said signal generating means, to said switching means and to said analog-to-digital conversion means,
wherein said control means comprises means for outputting said first enabling signal to said signal generating means during a first time interval, said third enabling signal to said analog-to-digital conversion means during a second time interval subsequent to said first time interval, and said disabling signal to said switching means during said first and second time intervals.

22. The digitizer tablet as defined in claim 21, further comprising memory means connected to store a digital signal output by said analog-to-digital conversion means in response to said third enabling signal from said control means.

23. A method of calibrating a digitizer system including a wedge-and-strip digitizer tablet, said tablet having a layer comprising a plurality of patterned electrodes for determining the coordinates of a movable coupling means placed on an operative surface of said tablet, each patterned electrode comprising electrically conductive material, said movable coupling means including a coupling electrode for electrostatically coupling with said patterned electrodes when at least one of said patterned electrodes is driven and said coupling means is in proximity to said operative surface, signal generating means for inputting a driving signal to at least one of said patterned electrodes, electronic processing means for receiving and processing analog signals generated in said coupling electrode in response to said driving signal to determine first and second coordinates of a point on said coupling means when said coupling means is in proximity to said tablet, and switching means for selectively enabling and disabling the transmission of output signals from said coupling electrode to said electronic processing means, said processing means including analog-to-digital conversion means, said method comprising the following steps:
(a) applying driving signals to at least one of said patterned electrodes during a first time interval;
(b) outputting a signal to said switching means which disables transmission of output signals from said coupling electrode during said first time interval;
(c) generating and storing a first digital signal corresponding to the analog signal received by said analog-to-digital conversion means during said first time interval;
(d) applying driving signals to said at least one of said patterned electrodes during a second time interval;
(e) outputting a signal to said switching means which enables transmission of output signals from said coupling electrode during said second time interval; and
(f) generating a second digital signal corresponding to the analog signal received by said analog-to-digital conversion means during said second time interval.

24. The method as defined in claim 23, further comprising the following steps:
(g) subtracting said first digital value from said second digital value to obtain a third digital value; and
(h) determining the measured coordinates of said point on said coupling means relative to said two-coordinate dimensional system utilizing said third digital value.

* * * * *